United States Patent
Okuda et al.

(10) Patent No.: US 7,715,971 B2
(45) Date of Patent: May 11, 2010

(54) VEHICLE AND CONTROL METHOD OF VEHICLE

(75) Inventors: Koichi Okuda, Susono (JP); Mitsuhiro Tabata, Suntou-gun (JP)

(73) Assignee: Toyota Jidosha Kabuhsiki Kaisha, Tokyo (JP)

( * ) Notice: Subject to any disclaimer, the term of this patent is extended or adjusted under 35 U.S.C. 154(b) by 672 days.

(21) Appl. No.: 11/632,126

(22) PCT Filed: Mar. 24, 2006

(86) PCT No.: PCT/JP2006/306773
§ 371 (c)(1),
(2), (4) Date: Jan. 11, 2007

(87) PCT Pub. No.: WO2006/106894
PCT Pub. Date: Oct. 12, 2006

(65) Prior Publication Data
US 2007/0255477 A1  Nov. 1, 2007

(30) Foreign Application Priority Data
Mar. 31, 2005 (JP) ............ 2005-102119

(51) Int. Cl.
*B60K 31/00* (2006.01)
*B60L 11/14* (2006.01)
*G06F 19/00* (2006.01)
(52) U.S. Cl. ............ 701/93; 701/70; 180/179
(58) Field of Classification Search .......... 701/93, 701/96, 70, 300; 180/170, 179, 197; 303/140
See application file for complete search history.

(56) References Cited
U.S. PATENT DOCUMENTS 4,969,103 A * 11/1990 Maekawa ............... 701/96
5,285,865 A *  2/1994 Sakita ................. 180/179

(Continued)

FOREIGN PATENT DOCUMENTS

DE        101 45 915 A1    4/2003

(Continued)

*Primary Examiner*—Tan Q Nguyen
(74) *Attorney, Agent, or Firm*—Oliff & Berridge PLC

(57) ABSTRACT

In the vehicle of the invention, when the driver releases a depressed accelerator pedal, the drive control sets a vehicle speed V at the moment to a target vehicle speed V* (step S440). An engine and a motor for outputting driving power are controlled to drive the vehicle at the target vehicle speed V*. When the driver steps on a released brake pedal, the drive control stores the target vehicle speed V* set before the driver's depression of the brake pedal as a previous target vehicle speed Vpre and cancels the setting of the target vehicle speed V* (steps S470 and S480). In response to the driver's subsequent release of the brake pedal, the drive control sets the vehicle speed V at the moment to the target vehicle speed V* (step S510) and restarts constant-speed drive (cruise drive). When the driver turns a steering wheel to or over a preset degree for a left turn or a right turn, the drive control sets the previous target vehicle speed V* to the target vehicle speed V* (step S520) and restarts the constant-speed drive. This arrangement ensures easy and quick start of the constant-speed drive (cruise drive) and enables the constant-speed drive (cruise drive) according to the variation of the driving state.

28 Claims, 8 Drawing Sheets

U.S. PATENT DOCUMENTS

| | | | | |
|---|---|---|---|---|
| 5,961,566 | A | * | 10/1999 | Heslop .................. 701/93 |
| 6,324,463 | B1 | | 11/2001 | Patel |
| 7,016,777 | B2 | * | 3/2006 | Suzuki et al. ............ 701/70 |
| 2004/0093145 | A1 | * | 5/2004 | Tanimichi et al. ......... 701/93 |

FOREIGN PATENT DOCUMENTS

| | | |
|---|---|---|
| DE | 103 47 844 A1 | 5/2005 |
| FR | 2 838 386 A1 | 10/2003 |
| JP | A-1-306334 | 12/1989 |
| JP | A-3-159825 | 7/1991 |
| JP | A-4-176735 | 6/1992 |
| JP | A-5-305822 | 11/1993 |
| JP | A-7-149168 | 6/1995 |
| JP | A 9-242579 | 9/1997 |
| JP | A-9-294308 | 11/1997 |
| JP | A-11-78596 | 3/1999 |
| JP | A-2000-4502 | 1/2000 |
| JP | A 2000-6682 | 1/2000 |
| JP | A-2000-8902 | 1/2000 |
| JP | A 2000-39062 | 2/2000 |
| JP | A-2000-247162 | 9/2000 |
| JP | A-2000-255279 | 9/2000 |
| JP | A-2001-157305 | 6/2001 |
| JP | A-2001-173481 | 6/2001 |
| JP | A-2001-191814 | 7/2001 |
| JP | A-2001-336466 | 12/2001 |
| WO | WO 2004/113112 A1 | 12/2004 |

* cited by examiner

VEHICLE AND CONTROL METHOD OF VEHICLE

TECHNICAL FIELD

The present invention relates to a vehicle and a control method of the vehicle.

BACKGROUND ART

One proposed technique sets a target vehicle speed equal to a constant vehicle speed, which is kept for a preset time period since the driver's ON operation of a main switch for constant-speed drive control and attains the constant-speed drive of the vehicle at the set target vehicle speed (see, for example, Japanese Patent Laid-Open Gazette No. 2000-6682). This proposed vehicle cancels the constant-speed drive in response to the driver's accelerator-on operation or brake-on operation.

DISCLOSURE OF THE INVENTION

This prior art technique requires the driver's ON operation of the main switch for constant-speed drive control to start the constant-speed drive. The prior art technique can set the target vehicle speed for the constant-speed drive only after the vehicle is kept at the constant speed for the preset time period. Namely it takes time to set the target vehicle speed.

The vehicle is generally controlled to apply a certain braking force, for example, by engine braking, in response to the driver's accelerator-off operation when the vehicle speed reaches or exceeds a preset reference level in the OFF position of the main switch for the constant-speed drive. The driver is thus required to keep the foot on the accelerator pedal for the constant-speed drive (cruise drive).

The vehicle and the vehicle control method of the invention thus aim to ensure easy and quick start of the constant-speed drive (cruise drive). The vehicle and the vehicle control method of the invention also aim to enable the constant-speed drive (cruise-drive) according to the variation of the driving state.

In order to attain at least part of the above and the other related objects, the vehicle and the vehicle control method of the invention have the configurations discussed below.

The present invention is directed to a vehicle including: a power output device that outputs driving power for driving said vehicle; an accelerator operation detection mechanism that detects a driver's accelerator operation; a vehicle speed measurement unit that measures a vehicle speed; a target vehicle speed setting module that sets a target vehicle speed equal to a vehicle speed measured by the vehicle speed measurement unit at the moment of the driver's accelerator operation from an accelerator-on state to an accelerator-off state detected by the accelerator operation detection mechanism; and a control module that, in the case where the target vehicle speed is not set, controls the power output device based on the driver's accelerator operation detected by the accelerator operation detection mechanism, while in the case where that the target vehicle speed is set, controls the power output device to drive said vehicle at the set target vehicle speed.

The vehicle of the invention sets the target vehicle speed equal to the vehicle speed measured at the moment of the driver's accelerator operation from the accelerator-on state to the accelerator-off state and controls the power output device for outputting the driving power to drive the vehicle at the target vehicle speed. This arrangement attains easy and quick start of the constant-speed drive (cruise drive) only by the driver's simple accelerator-off operation. In the case where the target vehicle speed is not set, the power output device is controlled according to the driver's accelerator operation. This enables the driver to feel the adequate acceleration corresponding to the accelerator operation.

In one preferable embodiment of the invention, the vehicle further includes a brake operation detection mechanism that detects the driver's brake operation. The target vehicle speed setting module cancels the setting of the target vehicle speed in response to the driver's brake operation from a brake-off state to a brake-on state detected by the brake operation detection mechanism. This arrangement enables the setting of the target vehicle speed to be readily cancelled by the driver's simple brake-on operation. In one preferable application of this embodiment, the target vehicle speed setting module newly sets the target vehicle speed equal to the vehicle speed measured by the vehicle speed measurement unit at the moment of the driver's subsequent brake operation to the brake-off state detected by the brake operation detection mechanism, after the cancellation of the setting of the target vehicle speed in response to the detection of the driver's brake operation to the brake-on state. The vehicle of this application cancels the setting of the target vehicle speed in response to the driver's brake-on operation and sets the vehicle speed measured at the moment of the driver's subsequent brake-off operation to the new target vehicle speed to restart the constant-speed drive (cruise drive). In another preferable application of the embodiment, the vehicle further includes a steering angle measurement unit that measures a steering angle of the vehicle. When the steering angle measured by the steering angle measurement unit after the cancellation of the setting of the target vehicle speed in response to the detection of the driver's brake operation to the brake-on state is not less than a preset threshold steering angle from a reference steering position for straight-ahead driving of the vehicle, the target vehicle speed setting module newly sets the cancelled target vehicle speed to the target vehicle speed on condition that the steering angle measured by the steering angle measurement unit decreases to be less than the preset threshold steering angle from the reference steering position for straight-ahead driving of the vehicle and that the brake operation detection mechanism detects the driver's subsequent brake operation to the brake-off state. The constant-speed drive (cruise drive) at the target vehicle speed set before a left turn or a right turn of the vehicle can be resumed after the left turn or the right turn of the vehicle.

In the vehicle of the invention, it is preferable that the target vehicle speed setting module cancels the setting of the target vehicle speed in response to the driver's accelerator operation from the accelerator-off state to the accelerator-on state detected by the accelerator operation detection mechanism. The vehicle of this arrangement cancels the setting of the target vehicle speed in response to the driver's accelerator-on operation and sets the vehicle speed measured at the moment of the driver's subsequent accelerator-off operation to the new target vehicle speed to restart the constant-speed drive (cruise drive).

In one preferable application of the vehicle of the invention, when the vehicle speed measured by the vehicle speed measurement unit is lower than a preset low reference vehicle speed, the target vehicle speed setting module sets the target vehicle speed to gradually increase the vehicle speed with elapsed time. This facilitates drive of the vehicle in a vehicle speed range of less than the preset low reference vehicle speed. This application is preferably combined with the structure that cancels the setting of the target vehicle speed in response to the driver's brake-on operation and sets the vehicle speed measured at the moment of the driver's subsequent brake-off operation to the new target vehicle speed. Such combination enables the vehicle to be driven by only the driver's brake operations in the vehicle speed range of less than the preset low reference vehicle speed. This arrangement does not require frequent change between the accelerator operation and the brake operation and desirably facilitates the drive of the vehicle.

In another preferable application of the vehicle of the invention, when the vehicle speed measured by the vehicle speed measurement unit is not lower than a preset high reference vehicle speed, the target vehicle speed setting module sets the target vehicle speed to gradually decrease the vehicle speed with elapsed time. This arrangement effectively prevents the driver from feeling idling at the vehicle speed of not lower than the preset high reference vehicle speed.

In still another preferable application of the vehicle of the invention, when a vehicle speed deviation as a difference between the vehicle speed measured by the vehicle speed measurement unit and the target vehicle speed reaches or exceeds a preset reference level, the target vehicle speed setting module sets the target vehicle speed to reduce the vehicle speed deviation. This arrangement eliminates the potential for significant deviation of the actual vehicle speed from the target vehicle speed on an uphill or a downhill and desirably prevents the driver from feeing acceleration beyond expectation at the end of the uphill or from feeling braking beyond expectation at the end of the downhill.

In one preferable structure of the vehicle of the invention, the power output device includes a motor that has power generation capability and outputs driving power for driving the vehicle, and an accumulator unit that transmits electric power to and from the motor. The control module controls the motor to drive the vehicle at the target vehicle speed, when being set, with the output power of the motor. This arrangement enables the delicate control of the constant-speed drive with a motor and ensures effective use of regenerative electric power.

In another preferable structure of the vehicle of the invention, the power output device includes an internal combustion engine that outputs driving power for driving the vehicle, a motor that has power generation capability and outputs driving power for driving the vehicle, and an accumulator unit that transmits electric power to and from the motor. The control module controls the internal combustion engine and the motor to drive the vehicle at the target vehicle speed, when being set, with both the output power of the internal combustion engine and the output power of the motor. This arrangement enables the delicate control of the constant-speed drive with a relatively low-power motor and reduces the frequencies of stop and restart of the internal combustion engine for intermittent operation.

In one preferable embodiment of the vehicle equipped with both the internal combustion engine and the motor as the power output device, the power output device also includes a connection disconnection mechanism that connects the internal combustion engine with an axle of the vehicle for transmission of the output power of the internal combustion engine to the axle and disconnects the internal combustion engine from the axle. The control module controls the internal combustion engine, the motor, and the connection disconnection mechanism to disconnect the internal combustion engine from the axle and to drive the vehicle with only the output power of the motor at the target vehicle speed, when being set. This arrangement enables the internal combustion engine to stop operation during the constant-speed drive.

In another preferable embodiment of the vehicle equipped with both the internal combustion engine and the motor as the power output device, the power output device also includes a connection disconnection mechanism that connects the internal combustion engine with an axle of the vehicle for transmission of the output power of the internal combustion engine to the axle and disconnects the internal combustion engine from the axle. Upon no satisfaction of a preset disconnection condition, the control module controls the internal combustion engine, the motor, and the connection disconnection mechanism to connect the internal combustion engine with the axle for transmission of the output power of the internal combustion engine to the axle and to drive the vehicle at the target vehicle speed, when being set, with both the output power of the internal combustion engine and the output power of the motor. Upon satisfaction of the preset disconnection condition, the control module controls the internal combustion engine, the motor, and the connection disconnection mechanism to disconnect the internal combustion engine from the axle and to drive the vehicle at the target vehicle speed, when being set, with only the output power of the motor. Namely the vehicle is driven at the constant speed with both the output power of the internal combustion engine and the output power of the motor upon no satisfaction of the preset disconnection condition, while being driven at the constant speed with only the output power of the motor upon satisfaction of the preset disconnection condition. This arrangement enables the use of a relatively low-power motor and attains the constant-speed drive with the output power of the internal combustion engine according to the requirements.

In the vehicle of the invention that selectively connects or disconnects the internal combustion engine with or from the axle for the constant-speed drive upon no satisfaction or upon satisfaction of the preset disconnection condition, the preset disconnection condition may be that the vehicle speed measured by the vehicle speed measurement unit is lower than a predetermined reference disconnection vehicle speed. The preset disconnection condition may be that a state of charge accumulated in the accumulator unit is not lower than a predetermined charge level.

In the vehicle of the invention that selectively connects or disconnects the internal combustion engine with or from the axle for the constant-speed drive upon no satisfaction or upon satisfaction of the preset disconnection condition, the control module may control the internal combustion engine, the motor, and the connection disconnection mechanism to operate the internal combustion engine in an efficient operation range, when the vehicle is driven at the target vehicle speed with both the output power of the internal combustion engine and the output power of the motor under the condition that the internal combustion engine is connected with the axle by the connection disconnection mechanism for transmission of the output power of the internal combustion engine. This arrangement desirably enhances the energy efficiency of the whole vehicle.

In one preferable application of the vehicle equipped with the connection disconnection mechanism, the control module controls the internal combustion engine to stop operation, when the internal combustion engine is disconnected from the axle by the connection disconnection mechanism under the condition of setting the target vehicle speed. This arrangement effectively improves the fuel consumption.

In another preferable application of the vehicle equipped with the connection disconnection mechanism, the control module controls the power output device to drive the vehicle at the target vehicle speed according to a state of charge accumulated in the accumulator unit, when the internal combustion engine is disconnected from the axle by the connection disconnection mechanism under the condition of setting the target vehicle speed. This arrangement enables the constant-speed drive according to the state of charge in the accumulator unit. In this application, the control module may control the power output device to drive the vehicle at the target vehicle speed in a specific range causing no overcharge or over-discharge of the accumulator unit, when the internal combustion engine is disconnected from the axle by the connection disconnection mechanism under the condition of setting the target vehicle speed. This arrangement effectively prevents overcharge and over-discharge of the accumulator unit.

In still another preferable application of the vehicle equipped with the connection disconnection mechanism, the connection disconnection mechanism includes a clutch linked to the internal combustion engine and a transmission linked to the axle. The motor may be arranged to output the power between the transmission and the clutch or to an axle side of the transmission.

In still another preferable embodiment of the vehicle equipped with both the internal combustion engine and the motor as the power output device, the motor is arranged to output the power to an axle different from an axle that receives transmission of the output power of the internal combustion engine. Namely the principle of the invention is actualized by the configuration of a four-wheel drive.

The present invention is directed to a first vehicle control method that controls a vehicle including: a power output device that outputs driving power for driving said vehicle; an accelerator operation detection mechanism that detects a driver's accelerator operation; and a vehicle speed measurement unit that measures a vehicle speed. The vehicle control method includes the steps of: (a) setting a target vehicle speed equal to a vehicle speed measured by the vehicle speed measurement unit at the moment of the driver's accelerator operation from an accelerator-on state to an accelerator-off state detected by the accelerator operation detection mechanism, and canceling the setting of the target vehicle speed upon satisfaction of a preset cancellation condition; and (b) in the case where the target vehicle speed is not set, controlling the power output device based on the driver's accelerator operation detected by the accelerator operation detection mechanism, while in the case where that the target vehicle speed is set, controlling the power output device to drive said vehicle at the set target vehicle speed.

The first vehicle control method of the invention sets the target vehicle speed equal to the vehicle speed measured at the moment of the driver's accelerator operation from the accelerator-on state to the accelerator-off state and controls the power output device for outputting the driving power to drive the vehicle at the target vehicle speed. This arrangement attains easy and quick start of the constant-speed drive (cruise drive) only by the driver's simple accelerator-off operation. In the case where the target vehicle speed is not set, the power output device is controlled according to the driver's accelerator operation. This enables the driver to feel the adequate acceleration corresponding to the accelerator operation.

The present invention is directed to a second vehicle control method that controls a vehicle including: an internal combustion engine that outputs driving power for driving said vehicle; a motor that has power generation capability and outputs driving power for driving said vehicle; an accumulator unit that transmits electric power to and from the motor; a connection disconnection mechanism that connects the internal combustion engine with an axle of said vehicle for transmission of the output power of the internal combustion engine to the axle and disconnects the internal combustion engine from the axle; an accelerator operation detection mechanism that detects a driver's accelerator operation; and a vehicle speed measurement unit that measures a vehicle speed. The second vehicle control method includes the steps of: (a) setting a target vehicle speed equal to a vehicle speed measured by the vehicle speed measurement unit at the moment of the driver's accelerator operation from an accelerator-on state to an accelerator-off state detected by the accelerator operation detection mechanism, and canceling the setting of the target vehicle speed upon satisfaction of a preset cancellation condition; (b1) in the case where the target vehicle speed is not set, controlling the internal combustion engine and the motor based on the driver's accelerator operation detected by the accelerator operation detection mechanism; and (b2) in the case where the target vehicle speed is set, upon no satisfaction of a preset disconnection condition, controlling the internal combustion engine, the motor, and the connection disconnection mechanism to connect the internal combustion engine with the axle for transmission of the output power of the internal combustion engine to the axle and to drive said vehicle at the target vehicle speed with both the output power of the internal combustion engine and the output power of the motor, while upon satisfaction of the preset disconnection condition, controlling the internal combustion engine, the motor, and the connection disconnection mechanism to disconnect the internal combustion engine from the axle and to drive said vehicle at the target vehicle speed with only the output power of the motor.

The second vehicle control method of the invention sets the target vehicle speed to a vehicle speed measured at a moment of the driver's accelerator operation from the accelerator-on state to the accelerator-off state. Upon no satisfaction of the preset disconnection condition, the second vehicle control method controls the internal combustion engine, the motor, and the connection disconnection mechanism to transmit the output power of the internal combustion engine to the axle and to drive the vehicle with both the output power of the internal combustion engine and the output power of the motor. Upon satisfaction of the preset disconnection condition, on the other hand, the second vehicle control method controls the internal combustion engine, the motor, and the connection disconnection mechanism to disconnect the internal combustion engine from the axle and to drive the vehicle with only the output power of the motor. This arrangement attains easy and quick start of the constant-speed drive (cruise drive) only by the driver's simple accelerator-off operation. Disconnection of the internal combustion engine from the axle allows a stop of the operation of the internal combustion engine. In the case where the target vehicle speed is not set, the power output device is controlled according to the driver's accelerator operation. The second vehicle control method thus enables the driver to feel adequate acceleration of the vehicle corresponding to the driver's accelerator operation.

BEST MODES OF CARRYING OUT THE INVENTION

Figure 1:
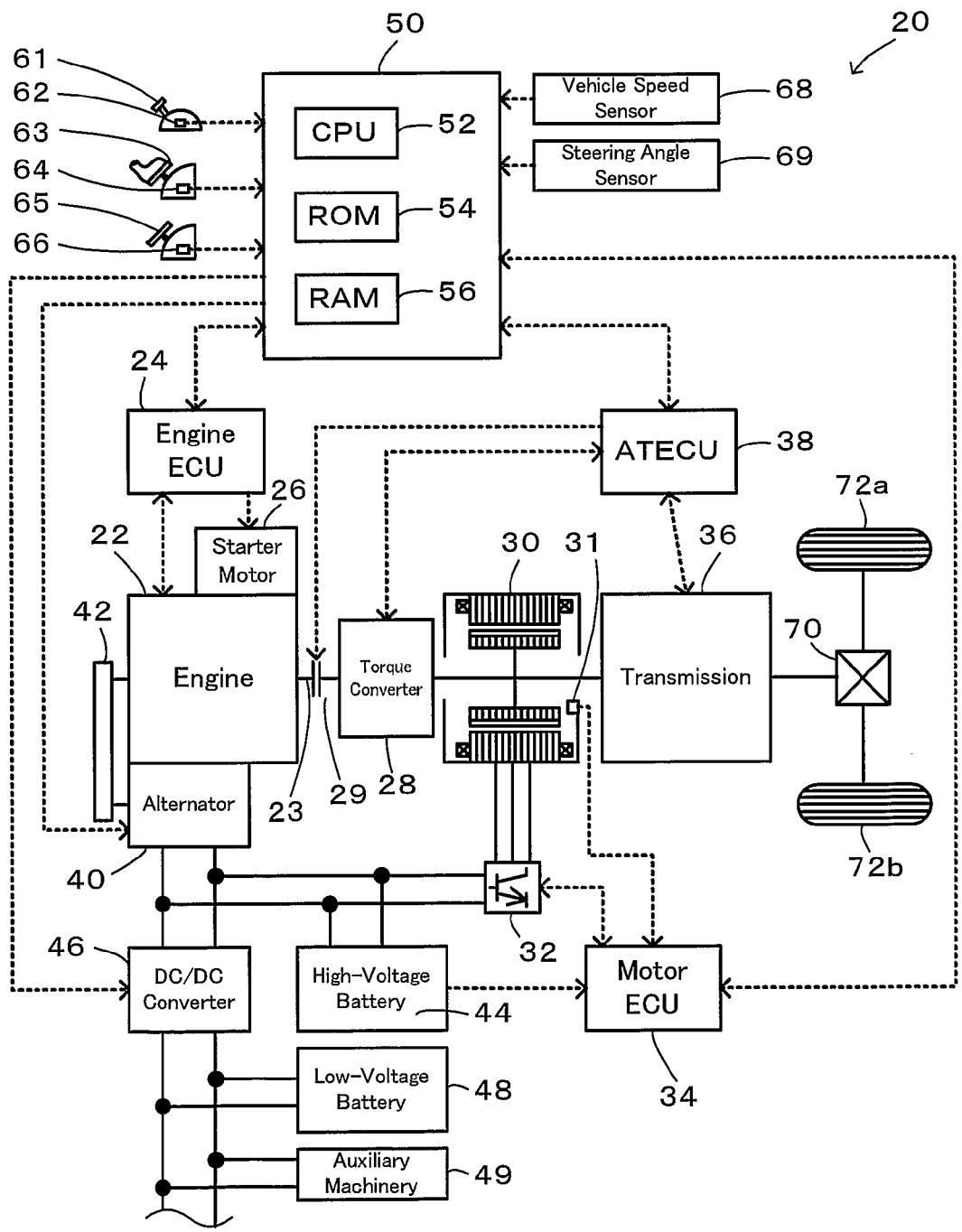
FIG. 1 schematically illustrates the configuration of a hybrid vehicle in one embodiment of the invention.

One modes of carrying out the invention is described below as a preferred embodiment with reference to the accompanied drawings. FIG. 1 schematically illustrates the configuration of a hybrid vehicle 20 in one embodiment of the invention. As illustrated in FIG. 1, the hybrid vehicle 20 of the embodiment includes an engine 22, a torque converter 28 that is connected to a crankshaft 23 or an output shaft of the engine 22 via a damper (not shown), a transmission 36 that is connected to the torque converter 28 via a clutch 29 and is linked to drive wheels 72a and 72b via a differential gear 70, and a motor 30 that inputs and outputs power from and to the input of the transmission 36 and has power generation capability. The hybrid vehicle 20 further includes an alternator 40 that is connected to the crankshaft 23 of the engine 22 via a belt 42 and generates electric power with the output power of the engine 22, a high-voltage battery 44 that transmits electric power from and to the alternator 40 and the motor 30, a DC-DC converter 46 that lowers a voltage of the electric power output from the alternator 40 and supplies the electric power of the lowered voltage to a low-voltage battery 48 and auxiliary machinery 49, and a hybrid-electronic control unit 50 that controls the operations of the whole hybrid vehicle 20.

The engine 22 is, for example, an internal combustion engine consuming a hydrocarbon fuel, such as gasoline or light oil, to output power. The engine 22 is under control of an engine electronic control unit 24 (hereafter referred to as engine ECU 24). The engine ECU 24 receives diverse signals from various sensors that measure and detect the operating conditions of the engine 22 and performs fuel injection control, ignition control, and air intake flow regulation. A starter motor 26 is attached to the crankshaft 23 of the engine 22 to crank the engine 22 according to the requirements. The engine ECU 24 establishes communication with the hybrid electronic control unit 50 to drive and control the engine 22 in response to control signals received from the hybrid electronic control unit 50 and to send data regarding the operating conditions of the engine 22 to the hybrid electronic control unit 50 according to the requirements.

The motor 30 is constructed as a known synchronous motor generator that may be actuated both as a generator and as a motor. The motor 30 inputs and outputs electric power from and to the high-voltage system including the alternator 40 and the high-voltage battery 44 via an inverter 32. The motor 30 is driven and controlled by a motor electronic control unit 34 (hereafter referred to as motor ECU 34). The motor ECU 34 inputs signals required for drive control of the motor 30, for example, a signal representing a rotational position of a rotor in the motor 30 from a rotational position detection sensor 31 and signals representing phase currents, which are to be supplied to the motor 30, from an electric current sensor (not shown). The motor ECU 34 outputs switching control signals to the inverter 32. The motor ECU 34 also manages the high-voltage battery 44 to input a battery current Ib, a battery voltage Vb, and a battery temperature Tb from an electric current sensor, a voltage sensor, and a temperature sensor connected to a power line from the high-voltage battery 44 and compute a state of charge SOC or an accumulated amount of electric power in the high-voltage battery 44 and an input limit Win and an output limit Wout of the high-voltage battery 44 from the input battery current Ib and the input battery voltage Vb. The motor ECU 34 establishes communication with the hybrid electronic control unit 50 to drive and control the motor 30 in response to control signals received from the hybrid electronic control unit 50 and to send data regarding the driving conditions of the motor 30 and the state of the high-voltage battery 44 to the hybrid electronic control unit 50 according to the requirements.

The transmission 36 is constructed as a belt-driven continuously variable transmission (CVT) in this embodiment. The transmission 36 and the torque converter 28 are under control of an automatic transmission electronic control unit 38 (hereafter referred to as ATECU 38). The ATECU 38 controls lockup of the torque converter 28, controls engagement and release of the clutch 29, and varies a change gear ratio γ of the transmission 36 according to the accelerator opening Acc and the vehicle speed V. The ATECU 38 establishes communication with the hybrid electronic control unit 50 to perform change speed control to vary the change gear ratio γ of the transmission 36 in response to control signals received from the hybrid electronic control unit 50 and to send data regarding the conditions of the torque converter 28 and the transmission 36 to the hybrid electronic control unit 50 according to the requirements.

The hybrid electronic control unit 50 is constructed as a microprocessor including a CPU 52, a ROM 54 that stores processing programs, a RAM 56 that temporarily stores data, input and output ports (not shown), and a communication port (not shown). The hybrid electronic control unit 50 receives, via its input port, a gearshift position SP or a current setting position of a gearshift lever 61 from a gearshift position sensor 62, an accelerator opening Acc or the driver's depression amount of an accelerator pedal 63 from an accelerator pedal position sensor 64, a brake pedal position BP or the driver's depression amount of a brake pedal 65 from a brake pedal position sensor 66, a vehicle speed V from a vehicle speed sensor 68, and a steering angle θ from a steering angle sensor 69. The hybrid electronic control unit 50 outputs, via its output port, driving signals to the alternator 40 and switching control signals to the DC-DC converter 46. The hybrid electronic control unit 50 establishes communication with the engine ECU 24, the motor ECU 34, and the ATECU 38 via its communication port to receive and send a diversity of control signals and data from and to the engine ECU 24, the motor ECU 34, and the ATECU 38 as described above.

In an engaged state of the clutch 29, that is, in an ON position of the clutch 29, the hybrid vehicle 20 of the embodiment constructed as described above drives mainly with the power of the engine 22 that goes through the gear change in the transmission 36 and is output to the drive wheels 72a and 72b. In a released state of the clutch 29, that is, in an OFF position of the clutch 29, on the other hand, the hybrid vehicle 20 drives with the power of the motor 30 that goes through the gear change in the transmission 36 and is output to the drive wheels 72a and 72b, while the engine 22 is in a stop. In the former state utilizing the output power of the engine 22 mainly for driving, the hybrid vehicle 20 may be driven with charging or discharging the high-voltage battery 44 in combination with regenerative control or power control of the motor 30. In the event of application of a braking force to the hybrid vehicle 20, the motor 30 is under regenerative control in the released state of the clutch 29, that is, in the OFF position of the clutch 29. The regenerative control of the motor 30 in the OFF position of the clutch 29 recovers the kinetic energy of the hybrid vehicle 20 and accordingly improves the fuel consumption.

Figure 2:
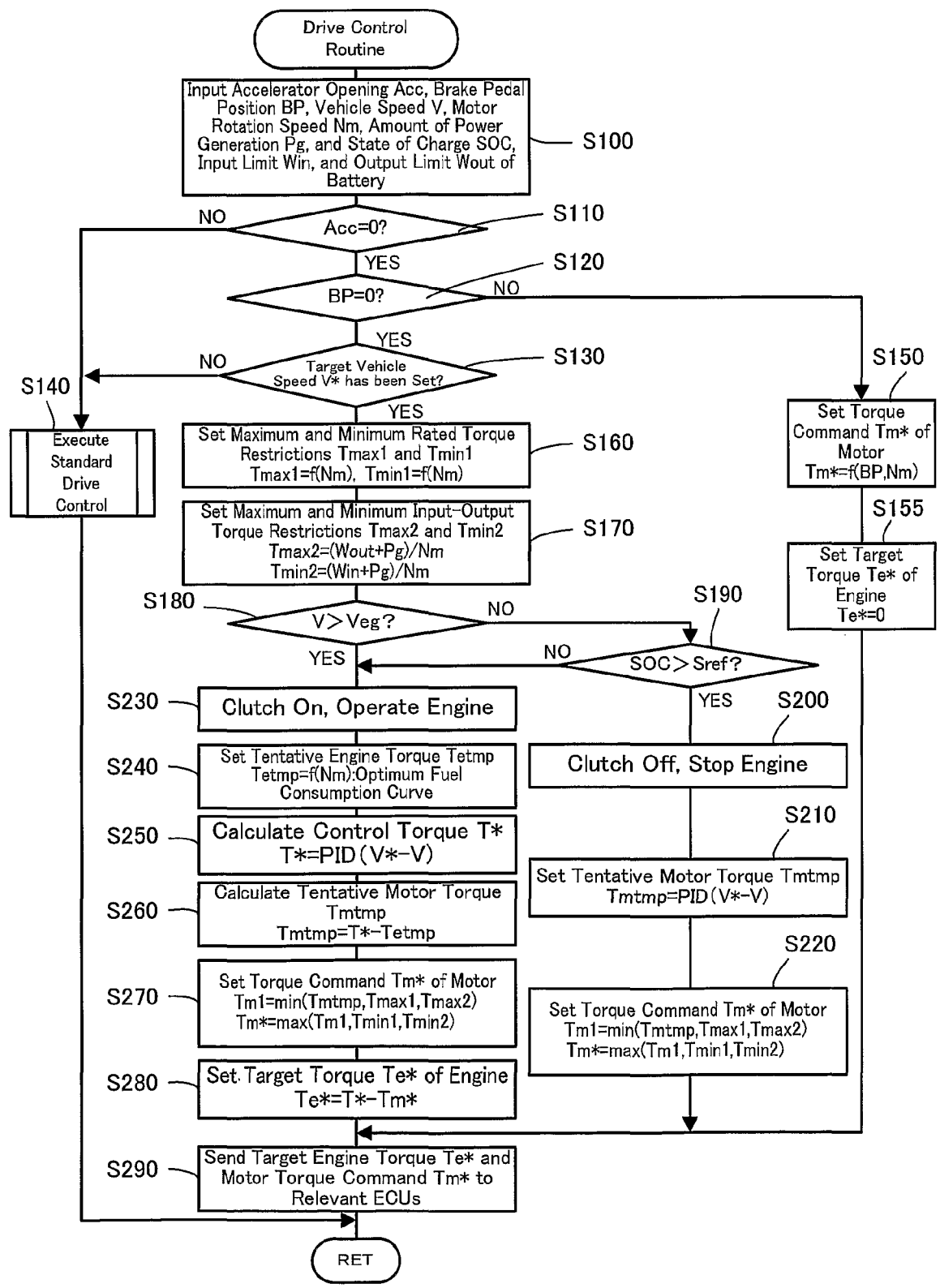
FIG. 2 is a flowchart showing a drive control routine executed by a hybrid electronic control unit mounted on the hybrid vehicle of the embodiment.
Figure 3:
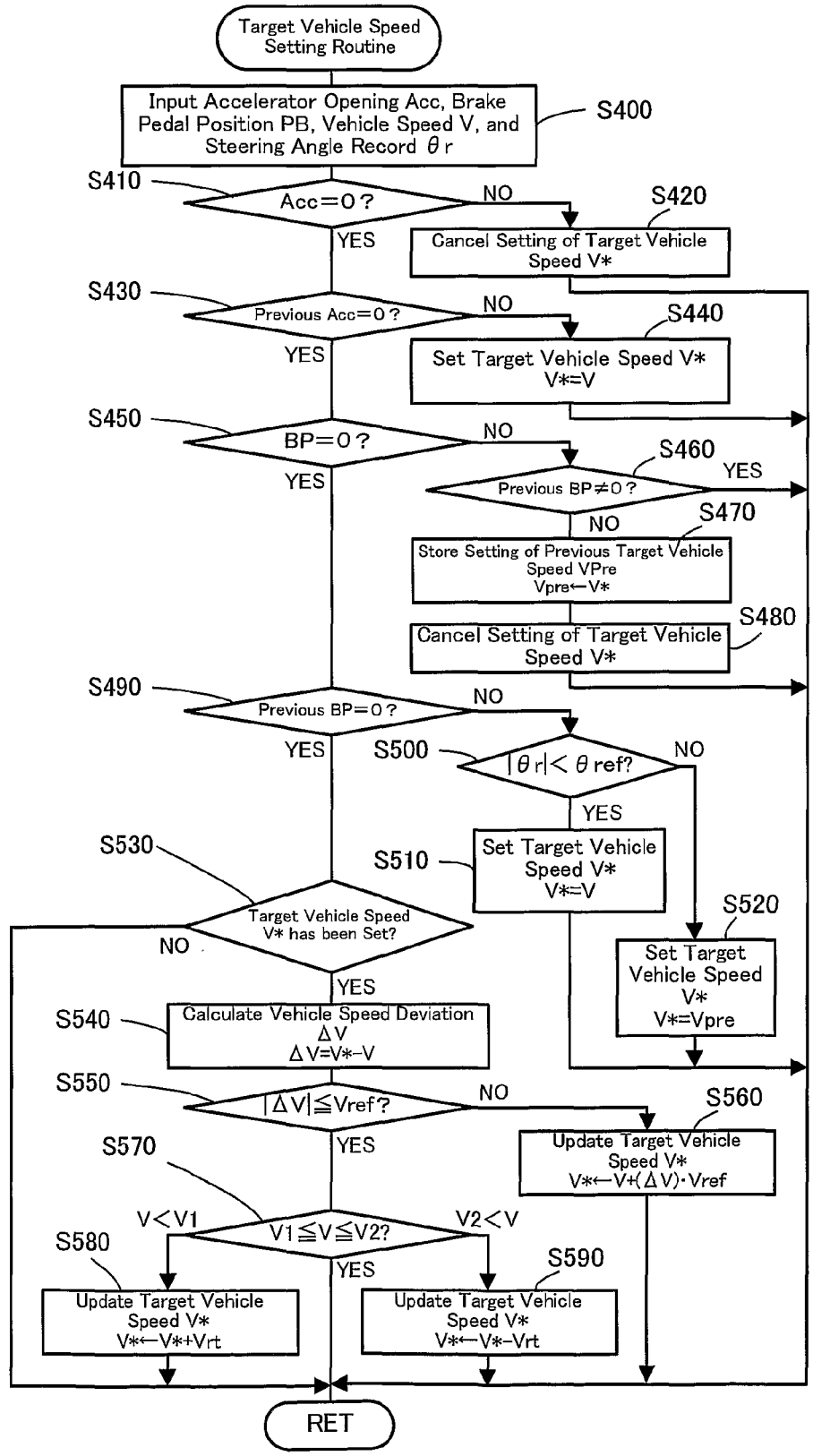
FIG. 3 is a flowchart showing a target vehicle speed setting routine executed by the hybrid electronic control unit in the hybrid vehicle of the embodiment.

The description regards the operations of the hybrid vehicle 20 of the embodiment having the configuration discussed above, especially a series of control operations in response to the driver's release of the accelerator pedal 63 to the accelerator-off state. FIG. 2 is a flowchart showing a drive control routine executed by the hybrid electronic control unit 50 included in the hybrid vehicle 20 of the embodiment. FIG. 3 is a flowchart showing a target vehicle speed setting routine to set a target vehicle speed V* required in the drive control routine of FIG. 2. The target vehicle speed setting routine of FIG. 3 is also executed by the hybrid electronic control unit 50. The drive control routine and the target vehicle speed setting routine are both executed repeatedly at preset time intervals, for example, at every several msec, since a start of the hybrid vehicle 20. The description sequentially regards the drive control process and the process of setting the target vehicle speed V*.

Figure 4:
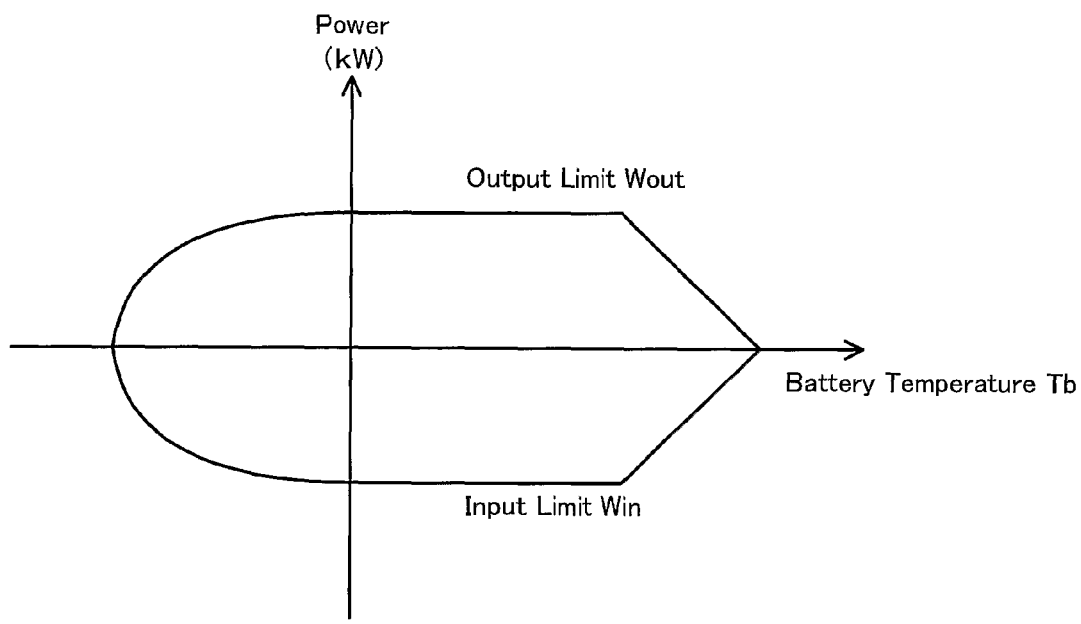
FIG. 4 shows variations in input limit Win and output limit Wout of a high-voltage battery against battery temperature Tb.
Figure 5:
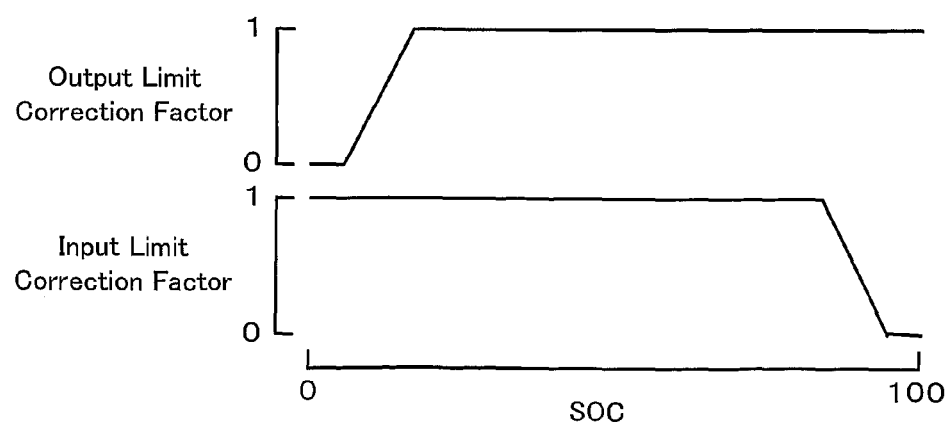
FIG. 5 shows variations of an input limit correction factor and an output limit correction factor against state of charge SOC of the high-voltage battery.

In the drive control routine of FIG. 2, the CPU 52 of the hybrid electronic control unit 50 first inputs various data required for control, that is, the accelerator opening Acc from the accelerator pedal position sensor 64, the brake pedal position BP from the brake pedal position sensor 66, the vehicle speed V from the vehicle speed sensor 68, a rotation speed Nm of the motor 30, an amount of power generation Pg by the alternator 40, the state of charge SOC of the high-voltage battery 44, and the input limit Win and the output limit Wout of the high-voltage battery 44 (step S100). The rotation speed Nm of the motor 30 is computed by the motor ECU 34 from the rotational position of the rotor in the motor 30 detected by the rotational position detection sensor 31 and is received from the motor ECU 34 by communication. The amount of power generation Pg by the alternator 40 is computed from a power generation command of the alternator 40. The state of charge SOC, the input limit Win, and the output limit Wout of the high-voltage battery 44 are computed by the motor ECU 34 from the battery current Ib, the battery voltage Vb, and the battery temperature Tb, which are measured by the electric current sensor, the voltage sensor, and the temperature sensor (not shown) connected to the power line from the high-voltage battery 44, and are received from the motor ECU 34 by communication. A concrete procedure of computing the input and output limits Win and Wout sets base values of the input limit Win and the output limit Wout corresponding to the measured battery temperature Tb, specifies an input limit correction factor and an output limit correction factor corresponding to the state of charge SOC of the high-voltage battery 44, and multiplies the base values of the input limit Win and the output limit Wout by the specified input limit correction factor and output limit correction factor to determine the input limit Win and the output limit Wout of the high-voltage battery 44. FIG. 4 shows variations of the input limit Win and the output limit Wout against the battery temperature Tb. FIG. 5 shows variations of the input limit correction factor and the output limit correction factor against the state of charge SOC of the high-voltage battery 44.

Figure 6:
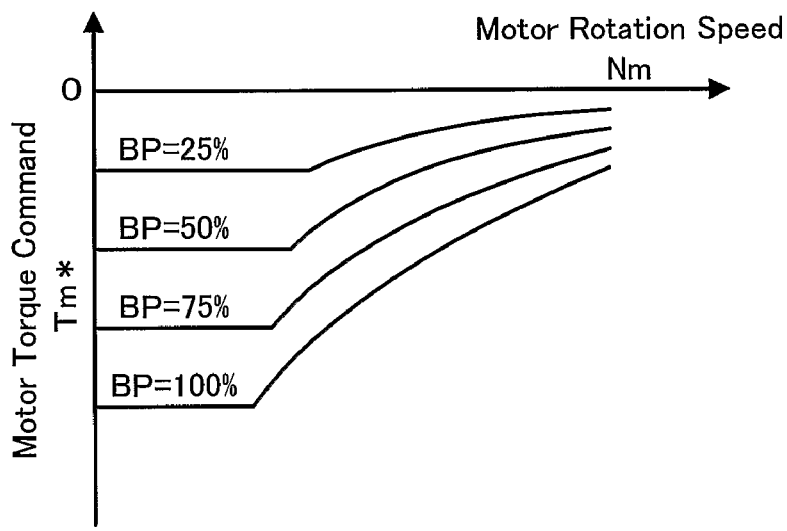
FIG. 6 shows one example of a torque setting map.

After the data input, the CPU 52 refers to the input accelerator opening Acc to specify an accelerator-off state (Acc=0) or an accelerator-on state (Acc≠0) (step S110), refers to the input brake pedal position BP to specify a brake-off state (BP=0) or a brake-on state (BP≠0) (step S120), and specifies setting or non-setting of a target vehicle speed V* (step S130). When the input accelerator opening Acc represents the accelerator-on state (Acc≠0) (step S110: No), the CPU 52 executes standard drive control to drive the hybrid vehicle 20 with the power of the engine 22 and the motor 30 transmitted to the drive wheels 72a and 72b according to the input accelerator opening Acc (step S140) and exits from this drive control routine of FIG. 2. The standard drive control, for example, regulates a throttle opening of the engine 22 corresponding to the accelerator opening Acc and sets a torque command Tm* of the motor 30. The standard drive control is not characteristic of the present invention and is thus not specifically described here in detail. When the input accelerator opening Acc represents the accelerator-off state (Acc=0) but the input brake pedal position BP represents the brake-on state (BP≠0) (step S110: Yes and step S120: No), the CPU 52 sets the torque command Tm* of the motor 30 corresponding to the brake pedal position BP and the rotation speed Nm of the motor 30 (step S150), sets a target torque Te* of the engine 22 equal to 0 (step S155), and sends the target engine torque Te* equal to 0 to the engine ECU 24 and the set motor torque command Tm* to the motor ECU 34 (step S290). The drive control routine of FIG. 2 is then terminated. A concrete procedure of setting the torque command Tm* in this embodiment stores in advance variations in torque command Tm* against the brake pedal position BP and the rotation speed Nm of the motor 30 as a torque setting map in the ROM 54 and reads the torque command Tm* corresponding to the given brake pedal position BP and the given rotation speed Nm of the motor 30 from this torque setting map. One example of the torque setting map is shown in FIG. 6. As shown in the map of FIG. 6, a negative torque, that is a torque command for power generation, is set to the torque command Tm* corresponding to the input brake pedal position BP. The engine ECU 24 receives the target engine torque Te* equal to 0 and cuts off the fuel supply in the operating state of the engine 22, while keeping the stop state of the engine 22. The motor ECU 34 receives the set motor torque command Tm* and performs switching control of switching elements included in the inverter 31 to drive the motor 30 with the torque command Tm*. Such control enables the motor 30 to output a regenerative torque corresponding to the driver's depression amount of the brake pedal 65 and charges the high-voltage battery 44 with the electric power regenerated by the motor 30. Accordingly the kinetic energy of the hybrid vehicle 20 is recovered in the form of electrical energy. Even when both the input accelerator opening Acc and the input brake pedal position BP specify the accelerator-off state (Acc=0) and the brake-off state (BP=0) (step S110: Yes and step S120: Yes), in the case of non-setting of the target vehicle speed V* (step S130: No), there is no need of performing control based on the target vehicle speed V*. The CPU 52 then executes the standard drive control (step S140) and exits from this drive control routine.

When both the input accelerator opening Acc and the input brake pedal position BP specify the accelerator-off state (Acc=0) and the brake-off state (BP=0) (step S110: Yes and step S120: Yes), in the case of setting of the target vehicle speed V* (step S130: Yes), on the other hand, the CPU 52 executes constant-speed drive control (cruise drive control) of steps S160 to S290 for regulation of the vehicle speed V to the target vehicle speed V* as described below. The constant-speed drive control first sets a maximum rated torque restriction Tmax1 and a minimum rated torque restriction Tmin1 as upper and lower output limits of rated torque of the motor 30 corresponding to the rotation speed Nm of the motor 30 (step S160). The constant-speed drive control then computes a maximum input-output torque restriction Tmax2 and a minimum input-output torque restriction Tmin2, which are equivalent to upper and lower limits of output torque of the motor 30, from the amount of power generation Pg and the input limit Win and the output limit Wout of the high-voltage battery 44 according to Equations (1) and (2) given below (step S170):

$$T\max2 = (W\text{out} + Pg)/Nm \quad (1)$$

$$T\min2 = (W\text{in} + Pg)/Nm \quad (2)$$

Figure 7:
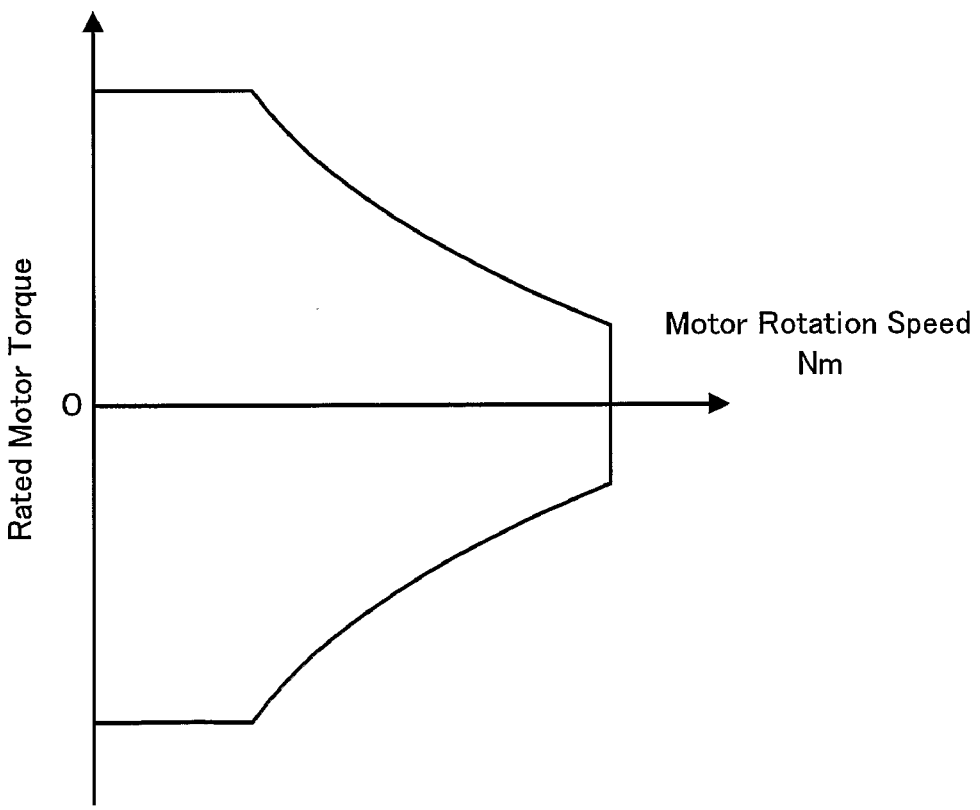
FIG. 7 shows one example of a rated torque restriction setting map.

A concrete procedure of setting the maximum and minimum rated torque restrictions Tmax1 and Tmin1 stores in advance a variation in rated torque of the motor 30 against the rotation speed Nm of the motor 30 as a rated torque restriction setting map in the ROM 54 and reads the maximum and minimum rated torque restrictions Tmax1 and Tmin1 corresponding to the given rotation speed Nm from the map. One example of the rated torque restriction setting map is shown in FIG. 7.

After setting the maximum and minimum rated torque restrictions Tmax1 and Tmin1 and the maximum and minimum input-output torque restrictions Tmax2 and Tmin2, the CPU 52 successively compares the vehicle speed V with a preset reference speed Veg (step S180) and the state of charge SOC of the high-voltage battery 44 with a preset reference charge Sref (step S190). The reference speed Veg represents a vehicle speed as a criterion of determining the requirement or non-requirement for operation of the engine 22 and depends upon the vehicle weight, the performance of the motor 30, and performance of the transmission 36. In this embodiment, the reference speed Veg is set close to an upper limit of the vehicle speed that ensures practically constant-speed drive with only the output power of the motor 30 even in the presence of some ups and downs of the road surface. The reference charge Sref is used as a criterion of determining the availability or unavailability of motor drive and depends upon the performance of the high-voltage battery 44 and the performance of the motor 30. In this embodiment, the reference charge Sref is set equal to a charge level having a low potential for over discharge of the high-voltage battery 44, for example, 10% or 15%.

When the vehicle speed V is not higher than the preset reference speed Veg (step S180: No) but the state of charge SOC of the high-voltage battery 44 is higher than the preset reference charge Sref (step S190: Yes), the CPU 52 specifies the availability of constant-speed drive of the hybrid vehicle 20 in a motor drive mode (that is, with only the power of the motor 30). The CPU 52 accordingly sets the clutch 29 in the released state, that is, in the OFF position, and stops the operation of the engine 22 (step S200). The CPU 52 subsequently calculates a tentative motor torque Tmtmp, which is to be output from the motor 30 for regulation of the vehicle speed V to the target vehicle speed V*, according to Equation (3) given below as a relational expression in feedback control (step S210.):

$$Tmtmp = k1 \cdot (V^* - V) + k2 \int (V^* - V) dt \quad (3)$$

The CPU 52 then limits the calculated tentative motor torque Tmtmp to the maximum and minimum rated torque restrictions Tmax1 and Tmin1 and to the maximum and minimum input-output torque restrictions Tmax2 and Tmin2 and eventually sets the torque command Tm* of the motor 30 (step S220). The CPU 52 sends the set torque command Tm* to the motor ECU 34 (step S290) and exits from the drive control routine of FIG. 2. A concrete procedure of stopping the engine 22 sends a stop control signal to the engine ECU 24, which then stops the fuel injection control and the ignition control of the engine 22. Such drive control of the motor 30 in combination with the stop of the engine 22 enables the constant-speed drive (cruise drive) in the motor drive mode within the range of the rated torque of the motor 30 and within the range of the input limit Win and the output limit Wout of the high-voltage battery 44. In Equation (3) given above, 'k1' in the first term and 'k2' in the second term on the right side respectively denote a gain of the proportional and a gain of the integral term. The drive control routine of FIG. 2 sends both the torque command Tm* of the motor 30 and the target torque Te* of the engine 22 at step S290 as mentioned above. The flow of the constant-speed drive stops the operation of the engine 22 and accordingly does not require transmission of the target engine torque Te*. For the simplicity of illustration, however, it is assumed that the flow of the constant-speed drive sends the torque command Tm* of the motor 30 at step S290.

Figure 8:
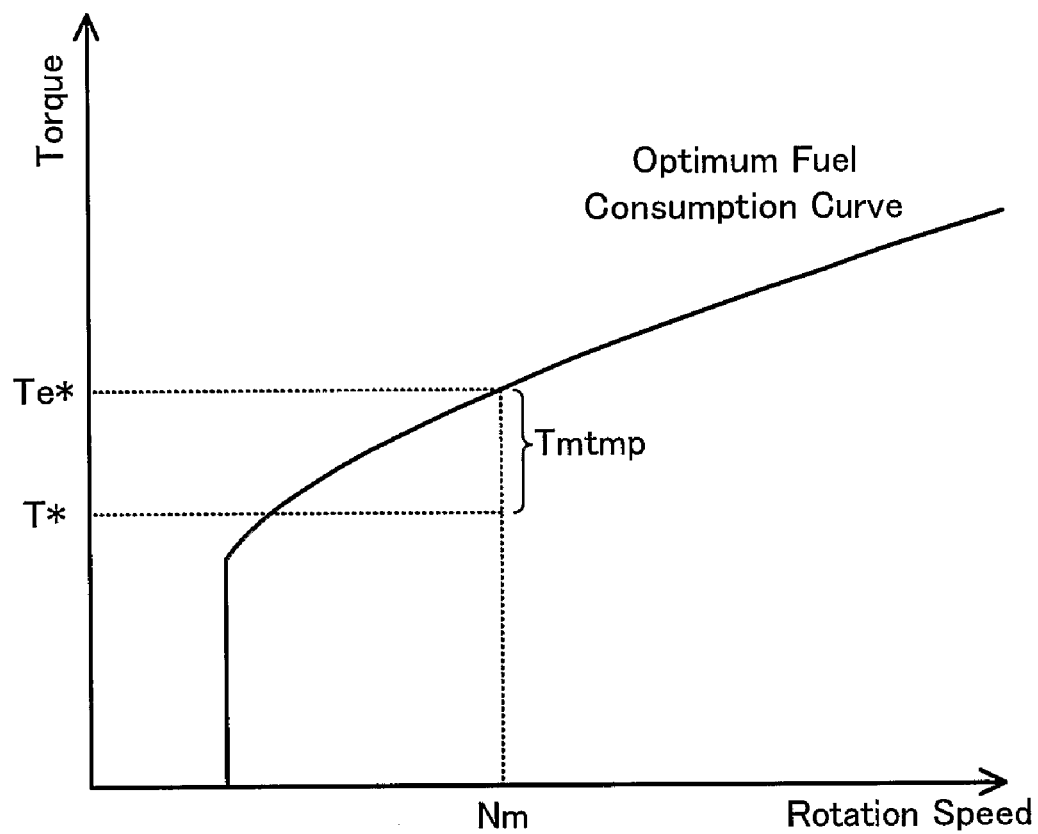
FIG. 8 shows an optimum fuel consumption curve of an engine in relation to a motor rotation speed Nm, a tentative engine torque Tetmp, a control torque T*, and a tentative motor torque Tmtmp.

When the vehicle speed V is higher than the preset reference speed Veg (step S180: Yes) or when the state of charge SOC of the high-voltage battery 44 is not higher than the preset reference charge Sref (step S190: No), the CPU 52 specifies the unavailability of the constant-speed drive of the hybrid vehicle 20 in the motor drive mode. The CPU 52 accordingly sets the clutch 29 in the engaged state, that is, in the ON position, and operates the engine 22 (step S230). The CPU 52 subsequently refers to an optimum fuel consumption curve that ensures efficient operation of the engine 22 to set a tentative engine torque Tetmp, which is to be output from the engine 22, corresponding to the rotation speed Nm of the motor 30 (step S240) and calculates a control torque T* according to Equation (3) given above (step S250). The calculation of the control torque T* at step S250 is identical with the calculation of the tentative motor torque Tmtmp at step S210 described above. The CPU 52 subtracts the tentative engine torque Tetmp from the calculated control torque T* to set the tentative motor torque Tmtmp (step S260). FIG. 8 shows one example of the optimum fuel consumption curve of the engine 22 in relation to the rotation speed Nm of the motor 30, the tentative engine torque Tetmp, the control torque T*, and the tentative motor torque Tmtmp. During constant-speed drive, no large power output is required. The torque converter 28 is accordingly locked up and the engine 22 is driven at the rotation speed Nm of the motor 30. The rotation speed Nm of the motor 30 is thus usable to set the tentative engine torque Tetmp according to the optimum fuel consumption curve of the engine 22. As shown in FIG. 8, the tentative engine torque Tetmp set according to the optimum fuel consumption curve is not equal to the control torque T*, which is to be output for regulation of the vehicle speed V to the target vehicle speed V*. The motor 30 is accordingly driven to output compensation for the torque difference. Such drive control enables operation of the engine 22 at an efficient drive point on the optimum fuel consumption curve and ensures output of the control torque T* with charge or discharge of the high-voltage battery 44. The drive control routine of this embodiment calculates the tentative motor torque Tmtmp as a torque requirement to be output from the motor 30.

The CPU 52 subsequently limits the calculated tentative motor torque Tmtmp to the maximum and minimum rated torque restrictions Tmax1 and Tmin1 and to the maximum and minimum input-output torque restrictions Tmax2 and Tmin2 and eventually sets the torque command Tm* of the motor 30 (step S270). The CPU 52 subtracts the set torque command Tm* from the control torque T* to set the target torque Te* of the engine 22 (step S280) and sends the target engine torque Te* to the engine ECU 24 and the motor torque command Tm* to the motor ECU 34 (step S290). The drive control routine of FIG. 2 is then terminated. When the tentative motor torque Tmtmp is within the range of the rated torque of the motor 30 and within the range of the input limit Win and the output limit Wout of the high-voltage battery 44, the tentative motor torque Tmtmp is set to the torque command Tm* of the motor 30. The tentative engine torque Tetmp is accordingly set to the target torque Te* of the engine 22. Under such conditions, the drive control ensures the required torque output for regulation of the vehicle speed V to the target vehicle speed V* simultaneously with the efficient operation of the engine 22 and thus attains the constant-speed drive (cruise drive) at the target vehicle speed V*. When the torque command Tm* of the motor 30 is set with limitation of the tentative motor torque Tmtmp to the maximum and minimum rated torque restrictions Tmax1 and Tmin1 and to the maximum and minimum input-output torque restrictions Tmax2 and Tmin2, a torque level set to the target torque Te* of the engine 22 is slightly different from the tentative engine torque Tetmp. Under such conditions, the drive control ensures the required torque output for regulation of the vehicle speed V to the target vehicle speed V* with only a slight decrease in engine operation efficiency, compared with the drive control under the condition that the tentative engine torque Tetmp is set to the target torque Te* of the engine 22. The drive control of this embodiment effectively enhances the energy efficiency of the hybrid vehicle 20 and ensures the required torque output for regulation of the vehicle speed V to the target vehicle speed V* within the range of the rated torque of the motor 30 and within the range of the input limit Win and the output limit Wout of the high-voltage battery 44, so as to attain the constant-speed drive (cruise drive) of the hybrid vehicle 20.

The target vehicle speed V* is set according to the target vehicle speed setting routine shown in the flowchart of FIG. 3. In the target vehicle speed setting routine of FIG. 3, the CPU 52 of the hybrid electronic control unit 50 first inputs data required for setting the target vehicle speed V*, that is, the accelerator opening Acc from the accelerator pedal position sensor 64, the brake pedal position BP from the brake pedal position 66, the vehicle speed V from the vehicle speed sensor 68, and a steering angle record θr (step S400). The steering angle record θr represents a maximum magnitude (absolute value) of the steering angle θ under the condition of the driver's steering operation and depression of the brake pedal 65 by a preset time before the present moment, for example, by 3 seconds or 5 seconds before the present moment. In this embodiment, the input steering angle record θr has been specified according to a steering angle record setting routine (not shown) and stored in a specific area of the RAM 56.

After the data input, the CPU 52 refers to the input accelerator opening Acc to specify the accelerator-off state (Acc=0) or the accelerator-on state (Acc≠0) (step S410). When the driver depresses the accelerator pedal 63 to set the accelerator-on state (Acc≠0) (step S410: No), the CPU 52 cancels the setting of the target vehicle speed V* (step S420) and exits from this target vehicle speed setting routine. Namely the setting of the target vehicle speed V* is cancelled in response to the driver's depression of the accelerator pedal 63, that is, in the accelerator-on state (Acc≠0).

When the driver releases the accelerator pedal 63 to set the accelerator-off state (Acc=0) (step S410: Yes), on the other hand, the CPU 52 determines whether a previous accelerator opening Acc input in a previous cycle of this routine is equal to 0 (Previous Acc=0 or Previous Acc≠0) (step S430). The result of this determination specifies either a switchover from the accelerator-on state to the accelerator-off state or continuation of the accelerator-off state. Upon a switchover from the accelerator-on state to the accelerator-off state (Previous Acc≠0) (step S430: No), the CPU 52 sets the input vehicle speed V to the target vehicle speed V* (step S440) and exits from this target vehicle speed setting routine. Namely this flow sets the target vehicle speed V* equal to the input vehicle speed V at the moment when the driver releases the accelerator pedal 63 to set the accelerator-off state. The drive control routine of FIG. 2 is then executed to attain the constant-speed drive (cruise drive) of the hybrid vehicle 20 and to keep the vehicle speed V at the target vehicle speed V*.

Upon continuation of the accelerator-off state (Previous Acc=0) (step S430: Yes), on the other hand, the CPU 52 refers to the input brake pedal position BP to specify the brake-off state (BP=0) or the brake-on state (BP≠0) (step S450). When the driver depresses the brake pedal 65 to set the brake-on state (BP≠0) (step S450: No), the CPU 52 determines whether a previous brake pedal position BP input in the previous cycle of this routine is not equal to 0 (Previous BP≠0 or Previous BP=0) (step S460). The result of this determination specifies either continuation of the brake-on state or a switchover from the brake-off state to the brake-on state. Upon a switchover from the brake-off state to the brake-on state (Previous BP=0) ·(step S460: No), the CPU 52 sets the current target vehicle speed V* to a previous target vehicle speed Vpre and stores the previous target vehicle speed Vpre (step S470) and cancels the setting of the target vehicle speed V* (step S480). The target vehicle speed setting routine is then terminated. Upon continuation of the brake-on state (Previous BP≠0) (step S460: Yes), setting of the current target vehicle speed V* to the previous target vehicle speed Vpre and cancellation of the setting of the target vehicle speed V* have already been implemented. The CPU 52 accordingly exits from the target vehicle speed setting routine without any further processing. Namely this flow stores the setting of the current target vehicle speed V* to the previous target vehicle speed Vpre and cancels the setting of the target vehicle speed V* at the moment when the driver depresses the brake pedal 65 to set the brake-on state.

When the driver releases the brake pedal 65 to set the brake-off state (BP=0) (step S450: Yes), on the other hand, the CPU 52 determines whether the previous brake pedal position BP input in the previous cycle of this routine is equal to 0 (Previous BP=0 or Previous BP≠0) (step S490). The result of this determination specifies either continuation of the brake-off state or a switchover from the brake-on state to the brake-off state. Upon a switchover from the brake-on state to the brake-off state (Previous BP≠0) (step S490: No), the CPU 52 compares the input steering angle record θr with a preset reference value θref (step S500). The reference value θref is used as a criterion of determining whether the driver depresses the brake pedal 65 in the course of a right turn, a left turn, a right U-turn, or a left U-turn of the hybrid vehicle 20, and depends upon the performance of a steering device. When the absolute value of the steering angle record θr is less than the preset reference value θref (step S500: Yes), it is determined that the driver's depression of the brake pedal 65 does not aim to make any of a right turn, a left turn, a right U-turn, and a left U-turn of the hybrid vehicle 20 but aims to simply decrease the vehicle speed V. The CPU 52 accordingly sets the current vehicle speed V to the target vehicle speed V* (step S510) and exits from the target vehicle speed setting routine. This flow sets the target vehicle speed V*. The drive control routine of FIG. 2 is then executed to attain the constant-speed drive (cruise drive) of the hybrid vehicle 20 and to keep the vehicle speed V at the target vehicle speed V*. When the absolute value of the steering angle record θr is not less than the preset reference value θref (step S500: No), on the other hand, it is determined that the driver's depression of the brake pedal 65 aims to make one of a right turn, a left turn, a right U-turn, and a left U-turn of the hybrid vehicle 20. The CPU 52 accordingly sets the previous target vehicle speed Vpre, which has been stored in response to the driver's depression of the brake pedal 65, to the target vehicle speed V* to recover the vehicle speed to the previous level before the brake-off operation (step S520) and exits from the target vehicle speed setting routine. This attains the constant-speed drive (cruise drive) of the hybrid vehicle 20 at the target vehicle speed V*, which has been set before the right turn, the left turn, the right U-turn, or the left U-turn of the hybrid vehicle 20.

Upon continuation of the brake-off state (Previous BP=0) (step S490: Yes), the CPU 52 specifies setting or non-setting of a target vehicle speed V* (step S530). In the case of non-setting of the target vehicle speed V* (step S530: No), the CPU 52 immediately exits from the target vehicle speed setting routine. In this state, the accelerator-off state and the brake-off state continue without setting of the target vehicle speed V*. Namely the hybrid vehicle 20 does not run at all or is driven with only a creep toque without the driver's depression of the accelerator pedal 63. The target vehicle speed setting routine is thus terminated without setting or cancellation of the target vehicle speed V*.

In the case of setting of the target vehicle speed V* (step S530: Yes), on the other hand, the CPU 52 calculates a vehicle speed deviation ΔV as a difference between the current vehicle speed V and the target vehicle speed V* (step S540) and compares the absolute value of the calculated vehicle speed deviation ΔV with a preset reference value Vref (step S550). When the absolute value of the calculated vehicle speed deviation ΔV is greater than the preset reference value Vref (step S550: No), the target vehicle speed V* is updated to a value varying from the current vehicle speed V by the preset reference value Vref in the direction of the target vehicle speed V* (step S560). The target vehicle speed setting routine is then terminated. The reference value Vref is used as a criterion of determining the requirement or non-requirement of updating the target vehicle speed V* according to the current vehicle speed V and is set equal to, for example, 3 km/h, 5 km/h, or 7 km/h. The motor 30 mounted on the hybrid vehicle 20 of the embodiment has a relatively insufficient power for acceleration and deceleration of the hybrid vehicle 20 in the motor drive mode with a relatively large acceleration. When the vehicle goes up a relatively steep uphill or goes down a relatively steep downhill during the constant-speed drive in the motor drive mode, the drive control routine of FIG. 2 calculates the tentative motor torque Tmtmp to be greater or smaller than a power operation limit torque or a regenerative operation limit torque of the motor 30 as the required torque for driving the hybrid vehicle 20 at the target vehicle speed V* (step S210). The drive control routine of FIG. 2 then limits the calculated tentative motor torque Tmtmp to the maximum rated torque restriction Tmax1 and the minimum rated torque restriction Tmin1 and sets the torque command Tm* of the motor 30 (step S220). Under such conditions, the motor 30 can not output a required torque to regulate the vehicle speed V of the hybrid vehicle 20 to the target vehicle speed V*. The actual vehicle speed V is thus gradually deviated from the target vehicle speed V*. If the target vehicle speed V* is not updated but is kept unchanged, at the end of the uphill or the downhill, a significantly large driving torque or a significantly large braking torque is set to the torque command Tm* of the motor 30 for regulation of the vehicle speed V to the target vehicle speed V*. The motor 30 is then driven with the torque command Tm* set to the significantly large driving torque or the significantly large braking torque. This results in application of the large driving torque or the large braking torque beyond the driver's expectation and causes the driver to feel uncomfortable and have the poor driving feeling. In order to prevent such driver's poor driving feeling, when the deviation of the actual vehicle speed V from the target vehicle speed V* reaches or exceeds the preset reference value Vref, the target vehicle speed setting routine of this embodiment updates the target vehicle speed V* to the value varying from the current vehicle speed V by the preset reference value Vref in the direction of the target vehicle speed V*. This arrangement effectively avoids application of the large driving torque or the large braking torque beyond the driver's expectation at the end of an uphill or a downhill and prevents the driver from feeling uncomfortable or from having poor driving feeling. Updating the target vehicle speed V* keeps the engine 22 at a stop and thus desirably prevents frequent stop and restart of the engine 22.

Referring back to the flowchart of FIG. 3, when the absolute value of the calculated vehicle speed deviation ΔV is not greater than the preset reference value Vref (step S550: Yes), the CPU 52 determines whether the current vehicle speed V is in a range of a preset first vehicle speed V1 to a preset second vehicle speed V2, which is higher than the first vehicle speed V (step S570). When the vehicle speed V is in this range, the CPU 52 exits from the target vehicle speed setting routine. When the vehicle speed V is lower than the preset first vehicle speed V1, the CPU 52 updates the target vehicle speed V* to a sum of the current target vehicle speed V* and an adjustment vehicle speed Vrt (step S580) and exits from the target vehicle speed setting routine. When the vehicle speed V is higher than the preset second vehicle speed V2, the CPU 52 updates the target vehicle speed V* by subtracting the adjustment vehicle speed Vrt from the current target vehicle speed V* (step S590) and exits from the target vehicle speed setting routine. The first vehicle speed V1 is set close to an upper limit of a specific vehicle speed range that facilitates the drive of the hybrid vehicle 20 with only the driver's on-off operation of the brake pedal 65 under the condition of a gradual increase of the vehicle speed. The first vehicle speed V1 is set, for example, 15 km/h, 20 km/h, or 25 km/h. The second vehicle speed V2 is set close to a lower limit of a certain vehicle speed range that may cause the driver to feel idling without a gradual decrease of the vehicle speed. The second vehicle speed V2 is set, for example, 30 km/h, 40 km/h, or 50 km/h. The adjustment vehicle speed Vrt is set to prevent the driver from feeling uncomfortable in the course of a gradual variation of the target vehicle speed V*. The adjustment vehicle speed Vrt depends upon, for example, the time interval of repetition of the target vehicle speed setting routine. When the vehicle speed V is lower than the preset first vehicle speed V1, the target vehicle speed V* is updated to increase gradually. Such updating facilitates the drive of the hybrid vehicle 20 with only the driver's on-off operation of the brake pedal 65. This arrangement does not require the driver's frequent pedal change between the accelerator pedal 63 and the brake pedal 65 and desirably facilitates the drive of the hybrid vehicle 20. When the vehicle speed V is higher than the preset second vehicle speed V2, the target vehicle speed V* is updated to decrease gradually. Such updating effectively prevents the driver from feeling idling.

Figure 9:
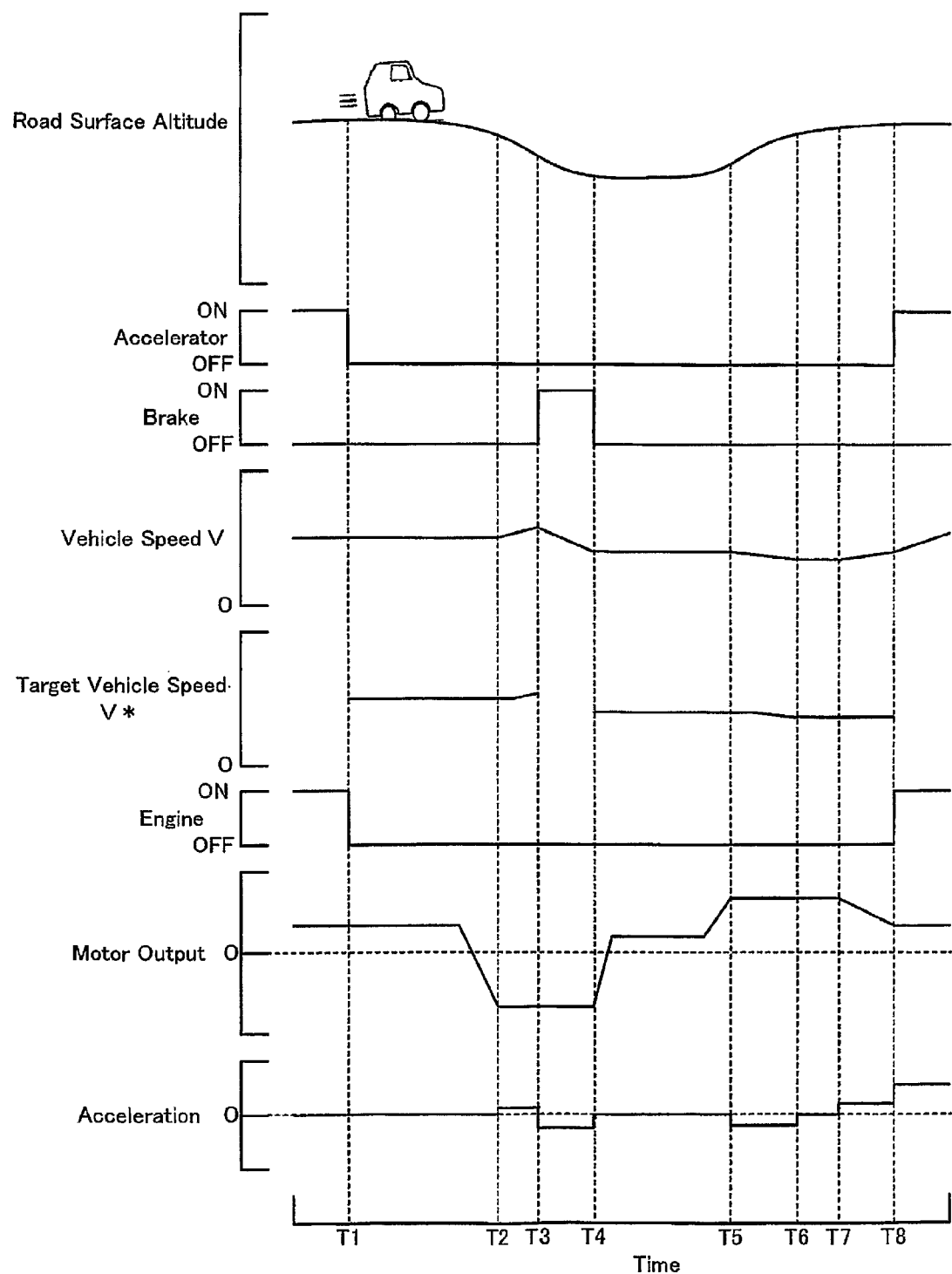
FIG. 9 shows time variations in accelerator on-off state, brake on-off state, vehicle speed V, target vehicle speed V*, operation-stop state of the engine, motor output, and acceleration of the hybrid vehicle during constant-speed drive (cruise drive) with setting of the target vehicle speed V* in response to the driver's release of an accelerator pedal (accelerator-off state)

FIG. 9 shows time variations in accelerator on-off state, brake on-off state, vehicle speed V, target vehicle speed V*, operation-stop state of the engine 22, output of the motor 30, and acceleration of the hybrid vehicle 20 during the constant-speed drive (cruise drive) with setting of the target vehicle speed V* in response to the driver's release of the accelerator pedal 63 (accelerator-off state). At a time T1 when the driver releases the accelerator pedal 63 to set the accelerator-off state, the vehicle speed V at the moment is set to the target vehicle speed V*. The hybrid vehicle 20 then stops the operation of the engine 22 and starts the constant-speed drive (cruise drive) in the motor drive mode. When the vehicle speed V is higher than the preset reference speed Veg or when the state of charge SOC of the high-voltage battery 44 is not higher than the preset reference charge Sref, the hybrid vehicle 20 continues operation of the engine 22 and starts the constant-speed drive (cruise drive) in the engine drive mode with the engine 22 driven on the optimum fuel consumption curve. When the hybrid vehicle 20 goes down a downhill, the output of the motor 30 decreases to regenerative torque output. The vehicle speed V starts increasing gradually at a time T2 when the output of the motor 30 reaches a regenerative torque output limit. The actual vehicle speed V is then gradually deviated from the target vehicle speed V*. When the absolute value of the vehicle speed deviation ΔV as the difference between the actual vehicle speed V and the target vehicle speed V* exceeds the preset reference value Vref, the target vehicle speed V* is updated to gradually increase. In response to the driver's depression of the brake pedal 65 (brake-on state) at a time T3, the setting of the target vehicle speed V* is cancelled and the vehicle speed V starts decreasing. When the driver releases the brake pedal 65 (brake-off state) at a time T4, the constant-speed drive (cruise drive) starts again with setting of the vehicle speed V at the moment to the target vehicle speed V*. When the driver turns a steering wheel of the hybrid vehicle 20 to a large extent, for example, for a left turn or a right turn, the absolute value of the steering angle record θr reaches or exceeds the preset reference value θref in response to the driver's release of the brake pedal 65 (brake-off state). Under such conditions, the constant-speed drive (cruise drive) starts with setting of the previous target vehicle speed Vpre stored in the brake-on state to the target vehicle speed V*. While the hybrid vehicle 20 goes up an uphill, the output of the motor 30 starts increasing. The vehicle speed V starts decreasing gradually at a time T5 when the output of the motor 30 reaches a power torque output limit. The actual vehicle speed V is then gradually deviated from the target vehicle speed V*. When the absolute value of the vehicle speed deviation ΔV as the difference between the actual vehicle speed V and the target vehicle speed V* exceeds the preset reference value Vref, the target vehicle speed V* is updated to gradually decrease. At a time T7 close to the end of the uphill, the hybrid vehicle 20 is slightly accelerated to cancel out the difference between the actual vehicle speed V and the target vehicle speed V*. At a time T8 when the driver steps on the accelerator pedal 63 (accelerator-on state) for further acceleration, the engine 22 starts with cancellation of the setting of the target vehicle speed V*.

As described above, the hybrid vehicle 20 of the embodiment sets the target vehicle speed V* in response to a simple switchover from the accelerator-on state to the accelerator-off state and starts the constant-speed drive (cruise drive) with the set target vehicle speed V*. This drive control ensures easy and quick start of the constant-speed drive (cruise drive). When the driver steps on the brake pedal 65 and subsequently releases the brake pedal 65 (in the case of a switchover from the brake-on state to the brake-off state), the constant-speed drive (cruise drive) restarts with setting of the vehicle speed V at the moment to the target vehicle speed V*. This drive control ensures easy and quick restart of the constant-speed drive (cruise drive). When the driver steps on the brake pedal 65 and turns the steering wheel right or left for a right turn or a left turn, the previous target vehicle speed V* set immediately before the driver's depression of the brake pedal 65 is set again to the target vehicle speed V*. The vehicle speed V thus readily increases to the original level after the left turn or the right turn. Namely the drive control of this embodiment enables the constant-speed drive (cruise drive) according to the variation of the driving state.

In the hybrid vehicle 20 of the embodiment, when the actual vehicle speed V is deviated from the target vehicle speed V* by or over the preset reference value Vref, the target vehicle speed V* is updated to the value varying from the current vehicle speed V by the preset reference value Vref in the direction of the target vehicle speed V*. This arrangement effectively avoids application of the large driving torque or the large braking torque beyond the driver's expectation at the end of an uphill or a downhill and prevents the driver from feeling uncomfortable or from having poor driving feeling. Updating the target vehicle speed V* in this manner keeps the engine 22 at a stop and thus desirably prevents frequent stop and restart of the engine 22. When the vehicle speed V is lower than the preset first vehicle speed V1, the target vehicle speed V* is updated to increase gradually. Such updating facilitates the drive of the hybrid vehicle 20 with only the driver's on-off operation of the brake pedal 65. This arrangement does not require the driver's frequent pedal change between the accelerator pedal 63 and the brake pedal 65 and desirably facilitates the drive of the hybrid vehicle 20. When the vehicle speed V is higher than the preset second vehicle speed V2, the target vehicle speed V* is updated to decrease gradually. Such updating effectively prevents the driver from feeling idling. Namely the drive control of this embodiment enables the constant-speed drive (cruise drive) according to the variation of the driving state.

When the vehicle speed V is higher than the preset reference speed Veg or when the state of charge SOC of the high-voltage battery 44 is not higher than the preset reference charge Sref, the hybrid vehicle 20 of the embodiment operates the engine 22 on the optimum fuel consumption curve to be driven efficiently at the rotation speed Nm of the motor 30. The motor 30 is then controlled to compensate for a difference between the control torque T* and the output torque of the engine 22. This arrangement desirably enhances the energy efficiency in the constant-speed drive (cruise drive).

In the hybrid vehicle 20 of the embodiment, in the case of a switchover from the brake-off state to the brake-on state, the drive control stores the current setting of the target vehicle speed V* as the previous target vehicle speed Vpre and cancels the setting of the target vehicle speed V*. In the case of a switchover from the brake-on state to the brake-off state, when the absolute value of the steering angle record θr is less than the preset reference value θref, the vehicle speed V at the moment is set to the target vehicle speed V*. In the case of a switchover from the brake-on state to the brake-off state, when the absolute value of the steering angle record θr is not less than the preset reference value θref, on the other hand, it is determined that the driver's depression of the brake pedal 65 aims to make one of a right turn, a left turn, a right U-turn, and a left U-turn of the hybrid vehicle 20. The drive control accordingly sets the previous target vehicle speed Vpre, which has been stored in response to the driver's depression of the brake pedal 65, to the target vehicle speed V*. One possible modification of this drive control may set the vehicle speed V at the moment to the target vehicle speed V* in response to a switchover from the brake-on state to the brake-off state, irrespective of the magnitude of the steering angle record θr. Another possible modification of this drive control may simply cancel the setting of the target vehicle speed V* in response to a switchover from the brake-off state to the brake-on state and may not set the target vehicle speed V* again in the case of a subsequent switchover from the brake-on state to the brake-off state.

In the hybrid vehicle 20 of the embodiment, when the actual vehicle speed V is deviated from the target vehicle speed V* by or over the preset reference value Vref, the target vehicle speed V* is updated to the value varying from the current vehicle speed V by the preset reference value Vref in the direction of the target vehicle speed V*. One possible modification of the drive control may update the target vehicle speed V* to the vehicle speed V at the moment when the vehicle speed V is deviated from the target vehicle speed V* by or over the preset reference value Vref. Another possible modification of the drive control may cancel the setting of the target vehicle speed V* when the vehicle speed V is deviated from the target vehicle speed V* by or over the preset reference value Vref. Still another possible modification may keep the setting of the target vehicle speed V* unchanged even when the vehicle speed V is deviated from the target vehicle speed V* by or over the preset reference value Vref.

In the hybrid vehicle 20 of the embodiment, when the vehicle speed V is lower than the preset first vehicle speed V1, the target vehicle speed V* is updated to increase gradually. One possible modification may not update the target vehicle speed V* even when the vehicle speed V is lower than the preset first vehicle speed V1. In the hybrid vehicle 20 of the embodiment, when the vehicle speed V is higher than the preset second vehicle speed V2, the target vehicle speed V* is updated to decrease gradually. One possible modification may not update the target vehicle speed V* even when the vehicle speed V is higher than the preset second vehicle speed V2. When the vehicle speed V is lower than the preset first vehicle speed V1, the drive control of the embodiment updates the target vehicle speed V* to the sum of the current target vehicle speed V* and the adjustment vehicle speed Vrt. When the vehicle speed V is higher than the preset second vehicle speed V2, the drive control updates the target vehicle speed V* by subtracting the adjustment vehicle speed Vrt from the current target vehicle speed V*. The adjustment vehicle speed Vrt added to the current target vehicle speed V* for updating under the condition of the vehicle speed V of lower than the preset first vehicle speed V1 may be identical with or different from the adjustment vehicle speed Vrt subtracted from the current target vehicle speed V* for updating under the condition of the vehicle speed V of higher than the preset second vehicle speed V2.

In the hybrid vehicle 20 of the embodiment, when the input accelerator opening Acc represents the accelerator-off state (Acc=0) but the input brake pedal position BP represents the brake-on state (BP≠0), the drive control sets the target torque Te* of the engine 22 equal to 0 and cuts off the fuel supply to the engine 22 under operation. One possible modification of the drive control sets the clutch 29 in the OFF position and stops the operation of the engine 22, instead of setting the target torque Te* of the engine 22 equal to 0.

In the hybrid vehicle 20 of the embodiment, when the vehicle speed V is higher than the preset reference speed Veg or when the state of charge SOC of the high-voltage battery 44 is not higher than the preset reference charge Sref, the drive control sets the target torque Te* of the engine 22 according to the optimum fuel consumption curve to drive the engine 22 efficiently at the rotation speed Nm of the motor 30. The torque command Tm* of the motor 30 is set to compensate for a difference between the control torque T* and the target torque Te* of the engine 22. The engine 22 and the motor 30 are controlled to output the target torque Te* and the torque command Tm* and accordingly satisfy the control torque T*. This control procedure is, however, not restrictive, but any other suitable control technique may be applied to ensure output of the control torque T* from the engine 22 and the motor 30. One modified control procedure sets the target torque Te* of the engine 22 to a torque required for constant-speed drive of the hybrid vehicle 20 on a flat road without any passengers, sets the torque command Tm* of the motor 30 to compensate for the difference between the control torque T* and the target torque Te* of the engine 22, and controls the engine 22 and the motor 30 to output the control torque T*.

In the hybrid vehicle 20 of the embodiment, the engagement (ON) and release (OFF) of the clutch 29 connect and disconnect the engine 22 with and from the axle. The hybrid vehicle 20 of the embodiment changes over the mode of constant-speed drive by a switchover of the clutch 29 between the ON position and the OFF position. In the released state of the clutch 29 to disconnect the engine 22 from the axle, the hybrid vehicle 20 is set in the motor drive mode attaining the constant-speed drive with only the power of the motor 30. In the engaged state of the clutch 29 to connect the engine 22 with the axle, on the other hand, the hybrid vehicle 20 is set in the engine drive mode attaining the constant-speed drive with the power of the engine 22. One modified structure of the hybrid vehicle 20 excludes the clutch 29 and attains the constant-speed drive with the power of the engine 22.

The transmission 36 mounted on the hybrid vehicle 20 of the embodiment is the belt-driven continuously variable transmission (CVT). This structure is, however, not essential, but the technique of the invention is applicable to other types of CVTs, other stepless transmissions, and even conventional step transmissions.

Figure 10:
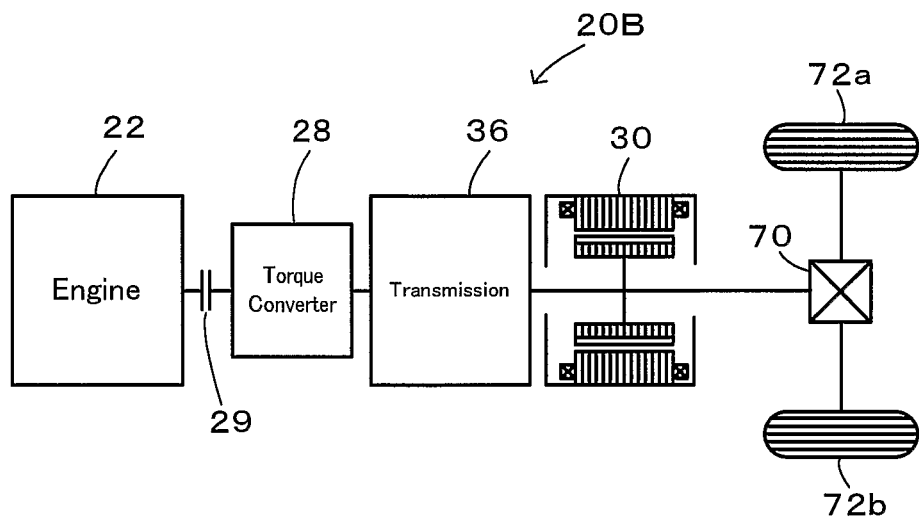
FIG. 10 schematically illustrates the configuration of another hybrid vehicle in one modified example.

In the hybrid vehicle 20 of the embodiment, the motor 30 is located between the transmission 36 and the engine 22. The technique of the invention is also applicable to a hybrid vehicle 20B of another configuration shown in FIG. 10. In the hybrid vehicle 20B of this modified configuration, the motor 30 and the engine 22 are arranged across the transmission 36. In this modified configuration, the drive control for the constant-speed drive in the engine drive mode sets the target torque Te* of the engine 22 according to the optimum fuel consumption line to drive the engine 22 at a specific rotation speed calculated by multiplying an engine rotation speed Ne or the motor rotation speed Nm by a preset change gear ratio γ.

Figure 11:
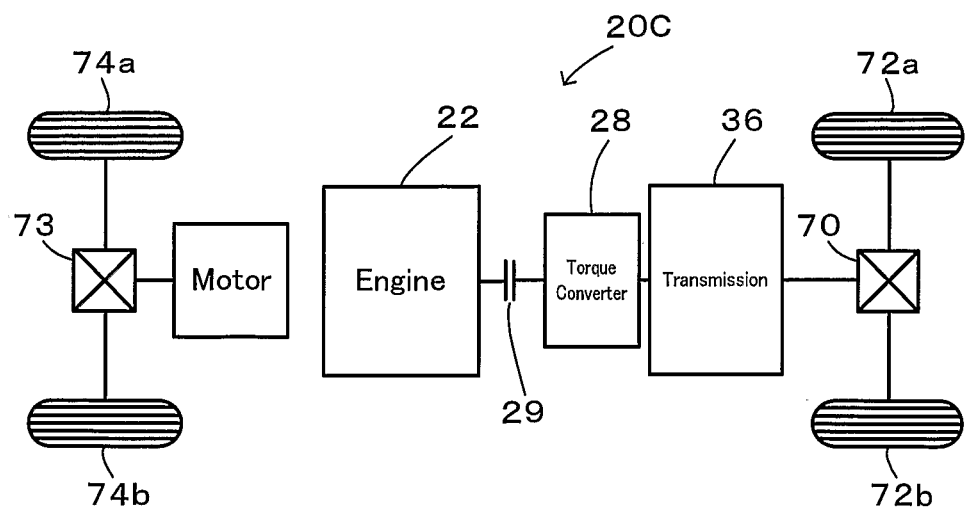
FIG. 11 schematically illustrates the configuration of still another hybrid vehicle in another modified example.

In the hybrid vehicle 20 of the embodiment, the motor 30 is arranged to output the power via the differential gear 70 to the drive wheels 72a and 72b, which also receive the output power of the engine 22. The technique of the invention is also applicable to a hybrid vehicle 20C of another configuration shown in FIG. 11. In the hybrid vehicle 20C of this modified configuration, the motor 30 is arranged to output the power via a differential gear 73 to the other drive wheels 74a and 74b, while the output power of the engine 22 is output to the drive wheels 72a and 72b. In this modified configuration, the drive control for the constant-speed drive in the engine drive mode sets the target torque Te* of the engine 22 according to the optimum fuel consumption line to drive the engine 22 at an engine rotation speed Ne.

The embodiment regards application of the invention to the hybrid vehicle 20 equipped with both the engine 22 and the motor 30. The technique of the invention is, however, not restricted to such hybrid vehicles but is also applicable to various vehicles of arbitrary configurations that are capable of setting the target vehicle speed V* in response to the driver's accelerator-off operation and attaining constant-speed drive. For example, the technique of the invention may be adopted in electric vehicles equipped with a motor and a battery, in fuel cell vehicles equipped with fuel cells, a battery, and a motor, and in conventional motor vehicle equipped with an engine.

The technique of the invention is not restricted to the hybrid vehicle 20 of the embodiment but is also attainable as a corresponding vehicle control method.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applied to automobile manufacturing industries and other relevant industries.

The invention claimed is:

1. A vehicle, comprising:
a power output device that outputs driving power for driving said vehicle;
an accelerator operation detection mechanism that detects a driver's accelerator operation;
a vehicle speed measurement unit that measures a vehicle speed;
a target vehicle speed setting module that sets a target vehicle speed equal to a vehicle speed measured by the vehicle speed measurement unit at the moment of the driver's accelerator operation from an accelerator-on state to an accelerator-off state detected by the accelerator operation detection mechanism; and
a control module that, in the case where the target vehicle speed is not set, controls the power output device based on the driver's accelerator operation detected by the accelerator operation detection mechanism,
in the case where that the target vehicle speed is set, said control module controlling the power output device to drive said vehicle at the set target vehicle speed.

2. A vehicle in accordance with claim 1, said vehicle further comprising:
a brake operation detection mechanism that detects the driver's brake operation,
wherein said target vehicle speed setting module cancels the setting of the target vehicle speed in response to the driver's brake operation from a brake-off state to a brake-on state detected by the brake operation detection mechanism.

3. A vehicle in accordance with claim 2, wherein said target vehicle speed setting module newly sets the target vehicle speed equal to the vehicle speed measured by the vehicle speed measurement unit at the moment of the driver's subsequent brake operation to the brake-off state detected by the brake operation detection mechanism, after the cancellation of the setting of the target vehicle speed in response to the detection of the driver's brake operation to the brake-on state.

4. A vehicle in accordance with claim 2, said vehicle further comprising:
a steering angle measurement unit that measures a steering angle of said vehicle,
wherein when the steering angle measured by the steering angle measurement unit after the cancellation of the setting of the target vehicle speed in response to the detection of the driver's brake operation to the brake-on state is not less than a preset threshold steering angle from a reference steering position for straight-ahead driving of said vehicle, said target vehicle speed setting module newly sets the cancelled target vehicle speed to the target vehicle speed on condition that the steering angle measured by the steering angle measurement unit decreases to be less than the preset threshold steering angle from the reference steering position for straight-ahead driving of said vehicle and that the brake operation detection mechanism detects the driver's subsequent brake operation to the brake-off state.

5. A vehicle in accordance with claim 1, wherein said target vehicle speed setting module cancels the setting of the target vehicle speed in response to the driver's accelerator operation from the accelerator-off state to the accelerator-on state detected by the accelerator operation detection mechanism.

6. A vehicle in accordance with claim 1, wherein when the vehicle speed measured by the vehicle speed measurement unit is lower than a preset low reference vehicle speed, said target vehicle speed setting module sets the target vehicle speed to gradually increase the vehicle speed with elapsed time.

7. A vehicle in accordance with claim 1, wherein when the vehicle speed measured by the vehicle speed measurement unit is not lower than a preset high reference vehicle speed, said target vehicle speed setting module sets the target vehicle speed to gradually decrease the vehicle speed with elapsed time.

8. A vehicle in accordance with claim 1, wherein when a vehicle speed deviation as a difference between the vehicle speed measured by the vehicle speed measurement unit and the target vehicle speed reaches or exceeds a preset reference level, said target vehicle speed setting module sets the target vehicle speed to reduce the vehicle speed deviation.

9. A vehicle in accordance with claim 1, wherein the power output device includes a motor that has power generation capability and outputs driving power for driving said vehicle, and an accumulator unit that transmits electric power to and from the motor, and
said control module controls the motor to drive said vehicle at the target vehicle speed, when being set, with the output power of the motor.

10. A vehicle in accordance with claim 1, wherein the power output device includes an internal combustion engine that outputs driving power for driving said vehicle, a motor that has power generation capability and outputs driving power for driving said vehicle, and an accumulator unit that transmits electric power to and from the motor, and
said control module controls the internal combustion engine and the motor to drive said vehicle at the target vehicle speed, when being set, with both the output power of the internal combustion engine and the output power of the motor.

11. A vehicle in accordance with claim 10, wherein the power output device has a connection disconnection mechanism that connects the internal combustion engine with an axle of said vehicle for transmission of the output power of the internal combustion engine to the axle and disconnects the internal combustion engine from the axle, and said control module controls the internal combustion engine, the motor, and the connection disconnection mechanism to disconnect the internal combustion engine from the axle and to drive said vehicle with only the output power of the motor at the target vehicle speed, when being set.

12. A vehicle in accordance with claim 11, wherein said control module controls the internal combustion engine to stop operation, when the internal combustion engine is disconnected from the axle by the connection disconnection mechanism under the condition of setting the target vehicle speed.

13. A vehicle in accordance with claim 11, wherein said control module controls the power output device to drive said vehicle at the target vehicle speed according to a state of charge accumulated in the accumulator unit, when the internal combustion engine is disconnected from the axle by the connection disconnection mechanism under the condition of setting the target vehicle speed.

14. A vehicle in accordance with claim 13, wherein said control module controls the power output device to drive said vehicle at the target vehicle speed in a specific range causing no overcharge or over-discharge of the accumulator unit, when the internal combustion engine is disconnected from the axle by the connection disconnection mechanism under the condition of setting the target vehicle speed.

15. A vehicle in accordance with claim 11, wherein the connection disconnection mechanism includes a clutch linked to the internal combustion engine and a transmission linked to the axle.

16. A vehicle in accordance with claim 15, wherein the motor is arranged to output the power between the transmission and the clutch or to an axle side of the transmission.

17. A vehicle in accordance with claim 10, wherein the power output device has a connection disconnection mechanism that connects the internal combustion engine with an axle of said vehicle for transmission of the output power of the internal combustion engine to the axle and disconnects the internal combustion engine from the axle, and upon no satisfaction of a preset disconnection condition, said control module controls the internal combustion engine, the motor, and the connection disconnection mechanism to connect the internal combustion engine with the axle for transmission of the output power of the internal combustion engine to the axle and to drive said vehicle at the target vehicle speed, when being set, with both the output power of the internal combustion engine and the output power of the motor, upon satisfaction of the preset disconnection condition, said control module controlling the internal combustion engine, the motor, and the connection disconnection mechanism to disconnect the internal combustion engine from the axle and to drive said vehicle at the target vehicle speed, when being set, with only the output power of the motor.

18. A vehicle in accordance with claim 17, wherein the preset disconnection condition is that the vehicle speed measured by the vehicle speed measurement unit is lower than a predetermined reference disconnection vehicle speed.

19. A vehicle in accordance with claim 17, wherein the preset disconnection condition is that a state of charge accumulated in the accumulator unit is not lower than a predetermined charge level.

20. A vehicle in accordance with claim 17, wherein said control module controls the internal combustion engine, the motor, and the connection disconnection mechanism to operate the internal combustion engine in an efficient operation range, when said vehicle is driven at the target vehicle speed with both the output power of the internal combustion engine and the output power of the motor under the condition that the internal combustion engine is connected with the axle by the connection disconnection mechanism for transmission of the output power of the internal combustion engine.

21. A vehicle in accordance with claim 17, wherein said control module controls the internal combustion engine to stop operation, when the internal combustion engine is disconnected from the axle by the connection disconnection mechanism under the condition of setting the target vehicle speed.

22. A vehicle in accordance with claim 17, wherein said control module controls the power output device to drive said vehicle at the target vehicle speed according to a state of charge accumulated in the accumulator unit, when the internal combustion engine is disconnected from the axle by the connection disconnection mechanism under the condition of setting the target vehicle speed.

23. A vehicle in accordance with claim 22, wherein said control module controls the power output device to drive said vehicle at the target vehicle speed in a specific range causing no overcharge or over-discharge of the accumulator unit, when the internal combustion engine is disconnected from the axle by the connection disconnection mechanism under the condition of setting the target vehicle speed.

24. A vehicle in accordance with claim 17, wherein the connection disconnection mechanism includes a clutch linked to the internal combustion engine and a transmission linked to the axle.

25. A vehicle in accordance with claim 24, wherein the motor is arranged to output the power between the transmission and the clutch or to an axle side of the transmission.

26. A vehicle in accordance with claim 10, wherein the motor is arranged to output the power to an axle different from an axle that receives transmission of the output power of the internal combustion engine.

27. A vehicle control method that controls a vehicle, said vehicle comprising: a power output device that outputs driving power for driving said vehicle; an accelerator operation detection mechanism that detects a driver's accelerator operation; and a vehicle speed measurement unit that measures a vehicle speed, said vehicle control method comprising the steps of:
(a) setting a target vehicle speed equal to a vehicle speed measured by the vehicle speed measurement unit at the moment of the driver's accelerator operation from an accelerator-on state to an accelerator-off state detected by the accelerator operation detection mechanism, and canceling the setting of the target vehicle speed upon satisfaction of a preset cancellation condition; and
(b) in the case where the target vehicle speed is not set, controlling the power output device based on the driver's accelerator operation detected by the accelerator operation detection mechanism, and
in the case where that the target vehicle speed is set, controlling the power output device to drive said vehicle at the set target vehicle speed.

28. A vehicle control method that controls a vehicle, said vehicle comprising: an internal combustion engine that outputs driving power for driving said vehicle; a motor that has power generation capability and outputs driving power for driving said vehicle; an accumulator unit that transmits electric power to and from the motor; a connection disconnection mechanism that connects the internal combustion engine with an axle of said vehicle for transmission of the output power of the internal combustion engine to the axle and disconnects the internal combustion engine from the axle; an accelerator operation detection mechanism that detects a driver's accelerator operation; and a vehicle speed measurement unit that measures a vehicle speed, said vehicle control method comprising the steps of:

(a) setting a target vehicle speed equal to a vehicle speed measured by the vehicle speed measurement unit at the moment of the driver's accelerator operation from an accelerator-on state to an accelerator-off state detected by the accelerator operation detection mechanism, and canceling the setting of the target vehicle speed upon satisfaction of a preset cancellation condition;

(b1) in the case where the target vehicle speed is not set, controlling the internal combustion engine and the motor based on the driver's accelerator operation detected by the accelerator operation detection mechanism; and (b2) in the case where the target vehicle speed is set, upon no satisfaction of a preset disconnection condition, controlling the internal combustion engine, the motor, and the connection disconnection mechanism to connect the internal combustion engine with the axle for transmission of the output power of the internal combustion engine to the axle and to drive said vehicle at the target vehicle speed with both the output power of the internal combustion engine and the output power of the motor, upon satisfaction of the preset disconnection condition, controlling the internal combustion engine, the motor, and the connection disconnection mechanism to disconnect the internal combustion engine from the axle and to drive said vehicle at the target vehicle speed with only the output power of the motor.

* * * * *